(12) United States Patent
Lv et al.

(10) Patent No.: US 12,367,766 B2
(45) Date of Patent: Jul. 22, 2025

(54) VEHICLE-TO-INFRASTRUCTURE COOPERATION METHOD AND APPARATUS

(71) Applicant: Shenzhen Yinwang Intelligent Technologies Co., Ltd., Shenzhen (CN)

(72) Inventors: Shujuan Lv, Shanghai (CN); Hao Hu, Beijing (CN); Yan Peng, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 212 days.

(21) Appl. No.: 17/589,354

(22) Filed: Jan. 31, 2022

(65) Prior Publication Data

US 2022/0157166 A1    May 19, 2022

Related U.S. Application Data

(63) Continuation of application No. PCT/CN2020/099028, filed on Jun. 29, 2020.

(30) Foreign Application Priority Data

Aug. 1, 2019 (CN) .......................... 201910707411.7

(51) Int. Cl.
*G08G 1/0967* (2006.01)
*G08G 1/01* (2006.01)
(Continued)

(52) U.S. Cl.
CPC ..... *G08G 1/096725* (2013.01); *G08G 1/0116* (2013.01); *G08G 1/0129* (2013.01);
(Continued)

(58) Field of Classification Search
CPC .............. G08G 1/0116; G08G 1/0129; G08G 1/096725; G08G 1/096741;
(Continued)

(56) References Cited

U.S. PATENT DOCUMENTS 9,754,325 B1 * 9/2017 Konrardy ................ H04W 4/44
2017/0061812 A1 * 3/2017 Lahav .................... G06Q 40/08
(Continued)

FOREIGN PATENT DOCUMENTS

CN    104751669 A    7/2015
CN    105809953 A    7/2016
(Continued)

*Primary Examiner* — Seth A Silverman
(74) *Attorney, Agent, or Firm* — Leydig, Voit & Mayer, Ltd.

(57) ABSTRACT

A first apparatus obtains first information, where the first information includes information about a road and/or information about an object on the road, and the object on the road includes a vehicle and/or a pedestrian on the road. The first apparatus determines a driving behavior of the first apparatus based on the first information and a capability of the first apparatus. Even if the capability of the first apparatus cannot be used to process complete information of the first information, the first apparatus can still determine the driving behavior of the first apparatus based on a part of information in the first information. This resolves a problem that a capability of an apparatus cannot fully match road side information. According to the technical solution, apparatuses with different capabilities can cooperate with different roads with different capabilities, to improve travel efficiency and safety.

10 Claims, 13 Drawing Sheets

(51) Int. Cl.
*G08G 1/16* (2006.01)
*H04W 4/44* (2018.01)

(52) U.S. Cl.
CPC . *G08G 1/096741* (2013.01); *G08G 1/096783* (2013.01); *G08G 1/164* (2013.01); *G08G 1/166* (2013.01); *H04W 4/44* (2018.02)

(58) Field of Classification Search
CPC .. G08G 1/096783; G08G 1/164; G08G 1/166; H04W 4/44
See application file for complete search history.

(56) References Cited

U.S. PATENT DOCUMENTS

| | | | | |
|---|---|---|---|---|
| 2017/0274907 | A1* | 9/2017 | Palmer | B60W 40/08 |
| 2018/0047288 | A1* | 2/2018 | Cordell | G08G 1/166 |
| 2019/0132709 | A1* | 5/2019 | Graefe | H04W 4/46 |
| 2019/0357834 | A1* | 11/2019 | Aarts | A61B 5/7246 |
| 2021/0133808 | A1* | 5/2021 | Chan | G06Q 40/03 |

FOREIGN PATENT DOCUMENTS

| | | |
|---|---|---|
| CN | 107533794 A | 1/2018 |
| CN | 107807633 A | 3/2018 |
| CN | 108039053 A | 5/2018 |
| CN | 108088448 A | 5/2018 |
| CN | 108263382 A | 7/2018 |
| CN | 108417087 A | 8/2018 |
| CN | 108688666 A | 10/2018 |
| CN | 108713221 A | 10/2018 |
| CN | 109285373 A | 1/2019 |
| CN | 109686095 A | 4/2019 |
| CN | 109714421 A | 5/2019 |
| CN | 109714730 A | 5/2019 |
| CN | 109743389 A | 5/2019 |
| SE | 1550351 A1 | 9/2016 |

* cited by examiner

VEHICLE-TO-INFRASTRUCTURE COOPERATION METHOD AND APPARATUS

CROSS-REFERENCE TO RELATED APPLICATION

This application is a continuation of International Application No. PCT/CN2020/099028, filed on Jun. 29, 2020, which claims priority to Chinese Patent Application No. 201910707411.7, filed on Aug. 1, 2019. The disclosures of the aforementioned applications are hereby incorporated by reference in their entireties.

TECHNICAL FIELD

This application relates to the field of communication technologies, and in particular, to a vehicle-to-infrastructure cooperation method and an apparatus.

BACKGROUND

Future trips are required to be safer, more efficient, and quicker. Traffic safety, traffic congestion, and environmental pollution are three major challenges currently confronted with in the traffic field, and are problems that need to be resolved to achieve future smart trips. In view of this, it is currently proposed to build an intelligent operation management system, and promote autonomous driving of vehicles, and related key demonstration projects oriented toward smart highways and urban traffic.

For the autonomous driving, a road side device may detect a target area, so as to determine motion information and status information of a target in the target area, and send the motion information and the status information of the target to a vehicle-mounted device. In this way, the vehicle-mounted device may be provided with environment information and the like of some blind spots, so that the vehicle-mounted device may perform autonomous driving based on the motion information and the status information of the target, to improve accuracy of vehicle control. However, in this solution, a prerequisite for cooperative processing between a road and a vehicle is that the two have corresponding processing capabilities. If either of the road and the vehicle does not have the corresponding capability, the problem cannot be resolved currently.

SUMMARY

Embodiments of this application provide a vehicle-to-infrastructure cooperation method and an apparatus, so that apparatuses with different capabilities can work cooperatively with roads with different capabilities.

According to a first aspect, a first vehicle-to-infrastructure cooperation method is provided, or the method may also be referred to as a method for obtaining first information, an automatic travel method, a communication method, or the like. The method includes: A first apparatus obtains first information, where the first information includes information about a road and/or information about an object on the road, and the object on the road includes a vehicle and/or a pedestrian on the road. The first apparatus determines a driving behavior of the first apparatus based on the first information and a capability of the first apparatus.

The method may be performed by a first communication apparatus. The first communication apparatus may be a communication device or a communication apparatus, for example, a chip system, that can support the communication device in implementing a required function of the method. For example, the first communication apparatus is a vehicle-mounted apparatus.

In this embodiment of this application, after obtaining the first information, the first apparatus may determine the driving behavior of the first apparatus based on the first information and the capability of the first apparatus. For example, if only a part of information in the first information can be processed based on the capability of the first apparatus, the first apparatus may process this part of information, to determine the driving behavior of the first apparatus. In other words, even if the capability of the first apparatus cannot be used to process complete information of the first information, the first apparatus can still determine the driving behavior of the first apparatus based on a part of information in the first information. This resolves a problem that a capability of an apparatus cannot fully match road side information. According to the technical solutions provided in the embodiments of this application, apparatuses with different capabilities can cooperate with different roads with different capabilities, to improve travel efficiency and safety.

In a possible implementation, the first information includes first-type information, and the first-type information includes information about a physical identifier and/or a marking on the road.

For example, for a road with a low capability, or a road that may be considered as an ordinary road, where for example, a road class of the road is a first road class, first information that can be provided by the road may include first-type information. For example, a stated-speed sign disposed on a road side, a turning line on the road, or the like may belong to the first-type information. The first-type information may be obtained by a second apparatus (for example, a road side apparatus). For example, the road side apparatus may collect the first-type information by using a perception apparatus (for example, a sensor) disposed on a road side, the road side apparatus may send the first-type information to the vehicle-mounted apparatus, or the vehicle-mounted apparatus may obtain the first-type information through detection by itself.

In a possible implementation, that the first apparatus determines a driving behavior of the first apparatus based on the first information and a capability of the first apparatus includes:

The first apparatus determines the driving behavior of the first apparatus based on the first-type information and the capability of the first apparatus.

For example, understanding may be implemented from a perspective of a capability of the vehicle-mounted apparatus and a road class of the road. The capability of the vehicle-mounted apparatus may match the road class of the road. For example, if a capability class of the vehicle-mounted apparatus is a first capability class, and the road class of the road is a first road class, the capability of the vehicle-mounted apparatus matches the road class of the road. That the capability of the vehicle-mounted apparatus matches the road class of the road means that, the vehicle-mounted apparatus can process information from the road side apparatus on the road, and decide a driving behavior based on the information. In this case, if the capability of the vehicle-mounted apparatus matches the road class of the road, the vehicle-mounted apparatus can process the information from the road side apparatus. For example, if the capability class of the vehicle-mounted apparatus is the first capability class, and the road class of the road is the first road class, the road side apparatus may send the first-type information, and the vehicle-mounted apparatus can receive the first-type information, and can determine a driving behavior of the vehicle-mounted apparatus (or a vehicle in which the vehicle-mounted apparatus is located) based on the first-type information.

In a possible implementation, the first information further includes second-type information, the second-type information is digital information, the digital information includes road traffic information within first duration, and the road traffic information is used to indicate any combination of one or more of the following: a traffic accident situation within the first duration, and a road construction status within the first duration, or a weather condition within the first duration.

For example, for a road with a high capability, where for example, a road class of the road is a second road class, the road may provide the second-type information in addition to the first-type information. For example, a road side apparatus on the road may communicate with a traffic control center to obtain road traffic information, or may communicate with an apparatus, such as a traffic light, on the road to obtain a traffic accident situation, a road construction status, or the like. Alternatively, the road side apparatus may communicate with a meteorological center and the like to obtain the weather condition. It can be learned that a road with a higher class indicates more types of information that can be provided, and more comprehensive coverage of the digital information. It is possible that, in addition to information about a road on which the vehicle-mounted apparatus is currently located, the digital information may further provide information about some other roads (for example, roads on which the vehicle in which the vehicle-mounted apparatus is located is about to travel). The vehicle-mounted apparatus decides, based on the digital information, the driving behavior of the vehicle in which the vehicle-mounted apparatus is located, and a decision result may be more accurate.

In a possible implementation, that the first apparatus determines a driving behavior of the first apparatus based on the first information and a capability of the first apparatus includes: The first apparatus determines the driving behavior of the first apparatus based on the second-type information and the capability of the first apparatus.

For example, understanding may be implemented from a perspective of a capability of the vehicle-mounted apparatus and a road class of the road. The capability of the vehicle-mounted apparatus may match the road class of the road. For example, if a capability class of the vehicle-mounted apparatus is a second capability class, and the road class of the road is a second road class, the capability of the vehicle-mounted apparatus matches the road class of the road. However, if the capability class of the vehicle-mounted apparatus is the first capability class and the road class of the road is the second road class, or the capability class of the vehicle-mounted apparatus is the second capability class and the road class of the road is the first road class, the capability of vehicle-mounted apparatus does not match the road class of the road. That the capability of the vehicle-mounted apparatus matches the road class of the road means that, the vehicle-mounted apparatus can process information from the road side apparatus on the road, and decide a driving behavior based on the information. In this case, if the capability of the vehicle-mounted apparatus matches the road class of the road, the vehicle-mounted apparatus can process the information from the road side apparatus. For example, if the capability class of the vehicle-mounted apparatus is the second capability class, and the road class of the road is the second road class, the road side apparatus may send the second-type information, and the vehicle-mounted apparatus can receive the second-type information, and can determine a driving behavior of the vehicle-mounted apparatus (or a vehicle in which the vehicle-mounted apparatus is located) based on the second-type information. However, if the capability of the vehicle-mounted apparatus does not match the road class of the road, for example, the capability class of the vehicle-mounted apparatus is the first capability class and the road class of the road is the second road class, the road side apparatus can send the second-type information, but the vehicle-mounted apparatus cannot receive the second-type information, or the vehicle-mounted apparatus can receive the second-type information, but cannot perform processing based on the second-type information. In this case, the vehicle-mounted apparatus can determine the driving behavior of vehicle-mounted apparatus based only on the first-type information. Alternatively, if the capability of the vehicle-mounted apparatus does not match the road class of the road, for example, the capability class of the vehicle-mounted apparatus is the second capability class, and the road class of the road is the first road class, the vehicle-mounted apparatus can determine the driving behavior of the vehicle-mounted apparatus (or the vehicle in which the vehicle-mounted apparatus is located) based on the second-type information, but the road side apparatus cannot send the second-type information. In this case, if the vehicle-mounted apparatus can obtain the second-type information by itself, the vehicle-mounted apparatus can decide the driving behavior of the vehicle-mounted apparatus based on the second-type information; or if the vehicle-mounted apparatus cannot obtain the second-type information by itself, the vehicle-mounted apparatus can only rely on the road side apparatus to obtain the second-type information, and in this case, the vehicle-mounted apparatus cannot obtain the second-type information, and therefore can determine the driving behavior of the vehicle-mounted apparatus based only on the first-type information.

In a possible implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

As a capability of the road is further improved, the road provides richer information. For example, if the road class of the road is a third road class, the road may provide the third-type information in addition to the first-type information and the second-type information. For example, one or more perception apparatuses (for example, sensors such as a camera and a temperature control apparatus) are disposed on the road. The road side apparatus may obtain perception information by using the perception apparatuses, so that the road side apparatus may provide the perception information to the vehicle-mounted apparatus. Alternatively, the vehicle-mounted apparatus may receive perception information from another vehicle. Alternatively, a perception apparatus such as a sensor may be installed on the vehicle-mounted apparatus, so that the vehicle-mounted apparatus may obtain perception information by itself. For example, some unexpected accidents or the like that occur on the road may be reflected by the perception information. The vehicle-mounted apparatus determines the driving behavior of the vehicle-mounted apparatus based on the perception information, so that the determined driving behavior is more accurate.

In a possible implementation, that the first apparatus determines a driving behavior of the first apparatus based on the first information and a capability of the first apparatus includes: The first apparatus determines the driving behavior of the first apparatus based on the third-type information and the capability of the first apparatus.

For example, understanding may be implemented from a perspective of a capability of the vehicle-mounted apparatus and a road class of the road. The capability of the vehicle-mounted apparatus may match the road class of the road. For example, if a capability class of the vehicle-mounted apparatus is a third capability class, and the road class of the road is a third road class, the capability of the vehicle-mounted apparatus matches the road class of the road. However, if the capability class of the vehicle-mounted apparatus is the first capability class or the second capability class and the road class of the road is the third road class, or the capability class of the vehicle-mounted apparatus is the third capability class and the road class of the road is the first road class or the second road class, the capability of vehicle-mounted apparatus does not match the road class of the road. If the capability of the vehicle-mounted apparatus matches the road class of the road, the vehicle-mounted apparatus can process the information from the road side apparatus. For example, if the capability class of the vehicle-mounted apparatus is the third capability class, and the road class of the road is the third road class, the road side apparatus may send the third-type information, and the vehicle-mounted apparatus can receive the third-type information, and can determine a driving behavior of the vehicle-mounted apparatus (or a vehicle in which the vehicle-mounted apparatus is located) based on the third-type information. However, if the capability of the vehicle-mounted apparatus does not match the road class of the road, for example, the capability class of the vehicle-mounted apparatus is the first capability class and the road class of the road is the third road class, the road side apparatus can send the third-type information, but the vehicle-mounted apparatus cannot receive the third-type information, or the vehicle-mounted apparatus can receive the third-type information, but cannot perform processing based on the third-type information. In this case, the vehicle-mounted apparatus can determine the driving behavior of vehicle-mounted apparatus based only on the first-type information. Alternatively, the capability class of the vehicle-mounted apparatus is the second capability class and the road class of the road is the third road class, the road side apparatus can send the third-type information, but the vehicle-mounted apparatus cannot receive the third-type information, or the vehicle-mounted apparatus can receive the third-type information, but cannot perform processing based on the third-type information. In this case, the vehicle-mounted apparatus can determine the driving behavior of vehicle-mounted apparatus based only on one or more of the first-type information or the second-type information.

Alternatively, if the capability of the vehicle-mounted apparatus does not match the road class of the road, for example, the capability class of the vehicle-mounted apparatus is the third capability class, and the road class of the road is the first road class, the vehicle-mounted apparatus can determine the driving behavior of the vehicle-mounted apparatus (or the vehicle in which the vehicle-mounted apparatus is located) based on the third-type information, but the road side apparatus cannot send the third-type information. In this case, if the vehicle-mounted apparatus can obtain the third-type information by itself, the vehicle-mounted apparatus can decide the driving behavior of the vehicle-mounted apparatus based on the third-type information; or if the vehicle-mounted apparatus cannot obtain the third-type information by itself, the vehicle-mounted apparatus can only rely on the road side apparatus to obtain the third-type information, and in this case, the vehicle-mounted apparatus cannot obtain the third-type information, and therefore can determine the driving behavior of the vehicle-mounted apparatus based only on the first-type information. Alternatively, the capability class of the vehicle-mounted apparatus is the third capability class, and the road class of the road is the second road class, the vehicle-mounted apparatus can determine the driving behavior of the vehicle-mounted apparatus (or the vehicle in which the vehicle-mounted apparatus is located) based on the third-type information, but the road side apparatus cannot send the third-type information. In this case, if the vehicle-mounted apparatus can obtain the third-type information by itself, the vehicle-mounted apparatus can decide the driving behavior of the vehicle-mounted apparatus based on the third-type information; or if the vehicle-mounted apparatus cannot obtain the third-type information by itself, the vehicle-mounted apparatus can only rely on the road side apparatus to obtain the third-type information, and in this case, the vehicle-mounted apparatus cannot obtain the third-type information, and therefore can determine the driving behavior of the vehicle-mounted apparatus based only on one or more of the first-type information or the second-type information.

In a possible implementation, the first information further includes fourth-type information, the fourth-type information is intent prediction information, and the intent prediction information is used to indicate a driving route of the object on the road within subsequent time.

As a capability of the road is further improved, the road provides richer information. For example, if the road class of the road is a fourth road class, the road may provide the fourth-type information in addition to the first-type information, the second-type information, and the third-type information. For example, the road side apparatus may obtain information about at least one vehicle on the road, for example, may obtain a historical driving route or a speed of the vehicle, or may obtain information about a pedestrian on the road, for example, may obtain a historical driving route of the pedestrian. In this way, the road side apparatus may predict a driving route of an object on the road within subsequent time based on the obtained information. For example, the road side apparatus may predict a driving route of a vehicle on the road within subsequent time, or may predict a driving route of a pedestrian on the road within subsequent time. The road side apparatus may send intent prediction information, so that the vehicle-mounted apparatus can consider the intent prediction information when determining the driving behavior of the vehicle-mounted apparatus (or the vehicle in which the vehicle-mounted apparatus is located). This prevents a collision, during travel, with another vehicle or pedestrian, and improves safety.

In a possible implementation, that the first apparatus determines a driving behavior of the first apparatus based on the first information and a capability of the first apparatus includes: The first apparatus determines the driving behavior of the first apparatus based on the fourth-type information and the capability of the first apparatus.

For example, understanding may be implemented from a perspective of a capability of the vehicle-mounted apparatus and a road class of the road. The capability of the vehicle-mounted apparatus may match the road class of the road. For example, if a capability class of the vehicle-mounted apparatus is a fourth capability class, and the road class of the road is a fourth road class, the capability of the vehicle-mounted apparatus matches the road class of the road. However, if the capability class of the vehicle-mounted apparatus is the first capability class, the second capability class, or the third capability class and the road class of the road is the fourth road class, or the capability class of the vehicle-mounted apparatus is the fourth capability class and the road class of the road is the first road class, the second road class, or the third road class, the capability of vehicle-mounted apparatus does not match the road class of the road. If the capability of the vehicle-mounted apparatus matches the road class of the road, the vehicle-mounted apparatus can process the information from the road side apparatus. For example, if the capability class of the vehicle-mounted apparatus is the fourth capability class, and the road class of the road is the fourth road class, the road side apparatus may send the fourth-type information, and the vehicle-mounted apparatus can receive the fourth-type information, and can determine a driving behavior of the vehicle-mounted apparatus (or a vehicle in which the vehicle-mounted apparatus is located) based on the fourth-type information. However, if the capability of the vehicle-mounted apparatus does not match the road class of the road, for example, the capability class of the vehicle-mounted apparatus is the first capability class and the road class of the road is the fourth road class, the road side apparatus can send the fourth-type information, but the vehicle-mounted apparatus cannot receive the fourth-type information, or the vehicle-mounted apparatus can receive the fourth-type information, but cannot perform processing based on the fourth-type information. In this case, the vehicle-mounted apparatus can determine the driving behavior of vehicle-mounted apparatus based only on the first-type information. Alternatively, the capability class of the vehicle-mounted apparatus is the second capability class and the road class of the road is the fourth road class, the road side apparatus can send the fourth-type information, but the vehicle-mounted apparatus cannot receive the fourth-type information, or the vehicle-mounted apparatus can receive the fourth-type information, but cannot perform processing based on the fourth-type information. In this case, the vehicle-mounted apparatus can determine the driving behavior of vehicle-mounted apparatus based only on one or more of the first-type information or the second-type information. Alternatively, the capability class of the vehicle-mounted apparatus is the third capability class and the road class of the road is the fourth road class, the road side apparatus can send the fourth-type information, but the vehicle-mounted apparatus cannot receive the fourth-type information, or the vehicle-mounted apparatus can receive the fourth-type information, but cannot perform processing based on the fourth-type information. In this case, the vehicle-mounted apparatus can determine the driving behavior of vehicle-mounted apparatus based only on one or more of the first-type information, the second-type information, or the third-type information.

Alternatively, if the capability of the vehicle-mounted apparatus does not match the road class of the road, for example, the capability class of the vehicle-mounted apparatus is the fourth capability class, and the road class of the road is the first road class, the vehicle-mounted apparatus can determine the driving behavior of the vehicle-mounted apparatus (or the vehicle in which the vehicle-mounted apparatus is located) based on the fourth-type information, but the road side apparatus cannot send the fourth-type information. In this case, if the vehicle-mounted apparatus can obtain the fourth-type information by itself, the vehicle-mounted apparatus can decide the driving behavior of the vehicle-mounted apparatus based on the fourth-type information; or if the vehicle-mounted apparatus cannot obtain the fourth-type information by itself, the vehicle-mounted apparatus can only rely on the road side apparatus to obtain the fourth-type information, and in this case, the vehicle-mounted apparatus cannot obtain the fourth-type information, and therefore can determine the driving behavior of the vehicle-mounted apparatus based only on the first-type information. Alternatively, the capability class of the vehicle-mounted apparatus is the fourth capability class, and the road class of the road is the second road class, the vehicle-mounted apparatus can determine the driving behavior of the vehicle-mounted apparatus (or the vehicle in which the vehicle-mounted apparatus is located) based on the fourth-type information, but the road side apparatus cannot send the fourth-type information. In this case, if the vehicle-mounted apparatus can obtain the fourth-type information by itself, the vehicle-mounted apparatus can decide the driving behavior of the vehicle-mounted apparatus based on the fourth-type information; or if the vehicle-mounted apparatus cannot obtain the fourth-type information by itself, the vehicle-mounted apparatus can only rely on the road side apparatus to obtain the fourth-type information, and in this case, the vehicle-mounted apparatus cannot obtain the fourth-type information, and therefore can determine the driving behavior of the vehicle-mounted apparatus based only on one or more of the first-type information or the second-type information. Alternatively, the capability class of the vehicle-mounted apparatus is the fourth capability class, and the road class of the road is the third road class, the vehicle-mounted apparatus can determine the driving behavior of the vehicle-mounted apparatus (or the vehicle in which the vehicle-mounted apparatus is located) based on the fourth-type information, but the road side apparatus cannot send the fourth-type information. In this case, if the vehicle-mounted apparatus can obtain the fourth-type information by itself, the vehicle-mounted apparatus can decide the driving behavior of the vehicle-mounted apparatus based on the fourth-type information; or if the vehicle-mounted apparatus cannot obtain the fourth-type information by itself, the vehicle-mounted apparatus can only rely on the road side apparatus to obtain the fourth-type information, and in this case, the vehicle-mounted apparatus cannot obtain the fourth-type information, and therefore can determine the driving behavior of the vehicle-mounted apparatus based only on one or more of the first-type information, the second-type information, or the third-type information.

In a possible implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

As a capability of the road is further improved, the road provides richer information. For example, if the road class of the road is a fifth road class, the road may provide the fifth-type information in addition to the first-type information, the second-type information, the third-type information, and the fourth-type information. For example, the road side apparatus may obtain information about at least one vehicle on the road, for example, may obtain a historical driving route or a speed of the vehicle, or may obtain information about a pedestrian on the road, for example, may obtain a historical driving route of the pedestrian. In this way, the road side apparatus may plan a subsequent driving route for an object on the road based on the obtained information. For example, the road side apparatus may predict a driving route within subsequent time for a vehicle on the road, or may predict a driving route within subsequent time for a pedestrian on the road. The road side apparatus may send the suggestion information, so that the vehicle-mounted apparatus can consider the suggestion information when determining a driving behavior of the vehicle-mounted apparatus (or a vehicle in which the vehicle-mounted apparatus is located). For example, the vehicle-mounted apparatus may directly use a driving route indicated by the suggestion information as a subsequent driving route. Alternatively, because the vehicle-mounted apparatus may further consider the first-type information, the second-type information, the third-type information, and the fourth-type information, the vehicle-mounted apparatus may determine a next driving route after comprehensively considering various information. In this way, the vehicle-mounted apparatus can prevent a collision, during travel, with another vehicle or pedestrian, and improve safety.

In a possible implementation, that the first apparatus determines a driving behavior of the first apparatus based on the first information and a capability of the first apparatus includes: The first apparatus determines the driving behavior of the first apparatus based on the fifth-type information and the capability of the first apparatus.

For example, understanding may be implemented from a perspective of a capability of the vehicle-mounted apparatus and a road class of the road. The capability of the vehicle-mounted apparatus may match the road class of the road. For example, if a capability class of the vehicle-mounted apparatus is a fifth capability class, and the road class of the road is a fifth road class, the capability of the vehicle-mounted apparatus matches the road class of the road. However, if the capability class of the vehicle-mounted apparatus is the first capability class, the second capability class, the third capability class, or the fourth capability class and the road class of the road is the fifth road class, or the capability class of the vehicle-mounted apparatus is the fifth capability class and the road class of the road is the first road class, the second road class, the third road class, or the fourth road class, the capability of vehicle-mounted apparatus does not match the road class of the road. If the capability of the vehicle-mounted apparatus matches the road class of the road, the vehicle-mounted apparatus can process the information from the road side apparatus. For example, if the capability class of the vehicle-mounted apparatus is the fifth capability class, and the road class of the road is the fifth road class, the road side apparatus may send the fifth-type information, and the vehicle-mounted apparatus can receive the fifth-type information, and can determine a driving behavior of the vehicle-mounted apparatus (or a vehicle in which the vehicle-mounted apparatus is located) based on the fifth-type information. However, if the capability of the vehicle-mounted apparatus does not match the road class of the road, for example, the capability class of the vehicle-mounted apparatus is the first capability class and the road class of the road is the fifth road class, the road side apparatus can send the fifth-type information, but the vehicle-mounted apparatus cannot receive the fifth-type information, or the vehicle-mounted apparatus can receive the fifth-type information, but cannot perform processing based on the fifth-type information. In this case, the vehicle-mounted apparatus can determine the driving behavior of vehicle-mounted apparatus based only on the first-type information. Alternatively, the capability class of the vehicle-mounted apparatus is the second capability class and the road class of the road is the fifth road class, the road side apparatus can send the fifth-type information, but the vehicle-mounted apparatus cannot receive the fifth-type information, or the vehicle-mounted apparatus can receive the fifth-type information, but cannot perform processing based on the fifth-type information. In this case, the vehicle-mounted apparatus can determine the driving behavior of vehicle-mounted apparatus based only on one or more of the first-type information or the second-type information. Alternatively, the capability class of the vehicle-mounted apparatus is the third capability class and the road class of the road is the fifth road class, the road side apparatus can send the fifth-type information, but the vehicle-mounted apparatus cannot receive the fifth-type information, or the vehicle-mounted apparatus can receive the fifth-type information, but cannot perform processing based on the fifth-type information. In this case, the vehicle-mounted apparatus can determine the driving behavior of vehicle-mounted apparatus based only on one or more of the first-type information, the second-type information, or the third-type information. Alternatively, the capability class of the vehicle-mounted apparatus is the fourth capability class and the road class of the road is the fifth road class, the road side apparatus can send the fifth-type information, but the vehicle-mounted apparatus cannot receive the fifth-type information, or the vehicle-mounted apparatus can receive the fifth-type information, but cannot perform processing based on the fifth-type information. In this case, the vehicle-mounted apparatus can determine the driving behavior of vehicle-mounted apparatus based only on one or more of the first-type information, the second-type information, the third-type information, or the fourth-type information.

Alternatively, if the capability of the vehicle-mounted apparatus does not match the road class of the road, for example, the capability class of the vehicle-mounted apparatus is the fifth capability class, and the road class of the road is the first road class, the vehicle-mounted apparatus can determine the driving behavior of the vehicle-mounted apparatus (or the vehicle in which the vehicle-mounted apparatus is located) based on the fifth-type information, but the road side apparatus cannot send the fifth-type information. In this case, if the vehicle-mounted apparatus can obtain the fifth-type information by itself, the vehicle-mounted apparatus can determine the driving behavior of the vehicle-mounted apparatus based on the fifth-type information; or if the vehicle-mounted apparatus cannot obtain the fifth-type information by itself, the vehicle-mounted apparatus can only rely on the road side apparatus to obtain the fifth-type information, and in this case, the vehicle-mounted apparatus cannot obtain the fifth-type information, and therefore can determine the driving behavior of the vehicle-mounted apparatus based only on the first-type information. Alternatively, the capability class of the vehicle-mounted apparatus is the fifth capability class, and the road class of the road is the second road class, the vehicle-mounted apparatus can determine the driving behavior of the vehicle-mounted apparatus (or the vehicle in which the vehicle-mounted apparatus is located) based on the fifth-type information, but the road side apparatus cannot send the fifth-type information. In this case, if the vehicle-mounted apparatus can obtain the fifth-type information by itself, the vehicle-mounted apparatus can decide the driving behavior of the vehicle-mounted apparatus based on the fifth-type information; or if the vehicle-mounted apparatus cannot obtain the fifth-type information by itself, the vehicle-mounted apparatus can only rely on the road side apparatus to obtain the fifth-type information, and in this case, the vehicle-mounted apparatus cannot obtain the fifth-type information, and therefore can determine the driving behavior of the vehicle-mounted apparatus based only on one or more of the first-type information or the second-type information. Alternatively, the capability class of the vehicle-mounted apparatus is the fifth capability class, and the road class of the road is the third road class, the vehicle-mounted apparatus can determine the driving behavior of the vehicle-mounted apparatus (or the vehicle in which the vehicle-mounted apparatus is located) based on the fifth-type information, but the road side apparatus cannot send the fifth-type information. In this case, if the vehicle-mounted apparatus can obtain the fifth-type information by itself, the vehicle-mounted apparatus can decide the driving behavior of the vehicle-mounted apparatus based on the fifth-type information; or if the vehicle-mounted apparatus cannot obtain the fifth-type information by itself, the vehicle-mounted apparatus can only rely on the road side apparatus to obtain the fifth-type information, and in this case, the vehicle-mounted apparatus cannot obtain the fifth-type information, and therefore can determine the driving behavior of the vehicle-mounted apparatus based only on one or more of the first-type information, the second-type information, or the third-type information. Alternatively, the capability class of the vehicle-mounted apparatus is the fifth capability class, and the road class of the road is the fourth road class, the vehicle-mounted apparatus can determine the driving behavior of the vehicle-mounted apparatus (or the vehicle in which the vehicle-mounted apparatus is located) based on the fifth-type information, but the road side apparatus cannot send the fifth-type information. In this case, if the vehicle-mounted apparatus can obtain the fifth-type information by itself, the vehicle-mounted apparatus can decide the driving behavior of the vehicle-mounted apparatus based on the fifth-type information; or if the vehicle-mounted apparatus cannot obtain the fifth-type information by itself, the vehicle-mounted apparatus can only rely on the road side apparatus to obtain the fifth-type information, and in this case, the vehicle-mounted apparatus cannot obtain the fifth-type information, and therefore can determine the driving behavior of the vehicle-mounted apparatus based only on one or more of the first-type information, the second-type information, the third-type information, or the fourth-type information.

According to a second aspect, a second vehicle-to-infrastructure cooperation method is provided. It is similar to the first aspect that, the method may also be referred to as a method for obtaining first information, an automatic travel method, a communication method, or the like. The method includes: A second apparatus obtains first information, where the first information includes information about a road and/or information about an object on the road, and the object on the road includes a vehicle and/or a pedestrian on the road. The second apparatus sends the first information, where the first information is used by a first apparatus to determine a driving behavior of the first apparatus.

The method may be performed by a second communication apparatus. The second communication apparatus may be a communication device or a communication apparatus, for example, a chip system, that can support a function required by the communication device to implement the method. For example, the second communication apparatus is a road side apparatus.

In a possible implementation, that a second apparatus obtains first information includes any combination of one or more of the following:

obtaining, by the second apparatus, the first information by using a perception apparatus disposed on a road side;

obtaining, by the second apparatus, the first information by using a cloud server; or receiving, by the second apparatus, the first information from the at least one vehicle on the road.

The second apparatus may obtain the first information in a plurality of manners, and a specific obtaining manner is not limited.

In a possible implementation, the first information includes second-type information, the second-type information is digital information, the digital information includes traffic information and/or meteorological information within first duration, the traffic information is used to indicate a traffic accident situation and/or a road construction status within the first duration, and the meteorological information is used to indicate a weather condition within the first duration.

In a possible implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

In a possible implementation, the first information further includes fourth-type information, the fourth-type information is intent prediction information, and the intent prediction information is used to indicate a driving route of the object on the road within subsequent time.

In a possible implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

For technical effects brought by the second aspect or the possible implementations, refer to the descriptions of the technical effects brought by the first aspect or the corresponding implementations.

According to a third aspect, a communication apparatus is provided. For example, the communication apparatus is the first apparatus described above. The first apparatus is configured to perform the method according to any one of the first aspect or the possible implementations. Specifically, the first apparatus may include a module configured to perform the method according to any one of the first aspect or the possible implementations. For example, the first apparatus includes a processing module, and optionally may further include a transceiver module. For example, the first apparatus is a communication device. For example, the communication device is a vehicle-mounted device, or a chip disposed in the vehicle-mounted device. Specifically, the processing module is configured to obtain first information, where the first information includes information about a road and/or information about an object on the road, and the object on the road includes a vehicle and/or a pedestrian on the road; and the processing module is further configured to determine a driving behavior of the first apparatus based on the first information and a capability of the first apparatus.

In a possible implementation, the first information includes first-type information, and the first-type information includes information about a physical identifier and/or a marking on the road.

In a possible implementation, the processing module is configured to determine the driving behavior of the first apparatus based on the first information and the capability of the first apparatus in the following manner:

determining the driving behavior of the first apparatus based on the first-type information and the capability of the first apparatus.

In a possible implementation, the first information further includes second-type information, the second-type information is digital information, the digital information includes road traffic information within first duration, and the road traffic information is used to indicate any combination of one or more of the following: a traffic accident situation within the first duration, and a road construction status within the first duration, or a weather condition within the first duration.

In a possible implementation, the processing module is configured to determine the driving behavior of the first apparatus based on the first information and the capability of the first apparatus in the following manner:

determining the driving behavior of the first apparatus based on the second-type information and the capability of the first apparatus.

In a possible implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

In a possible implementation, the processing module is configured to determine the driving behavior of the first apparatus based on the first information and the capability of the first apparatus in the following manner:

determining the driving behavior of the first apparatus based on the third-type information and the capability of the first apparatus.

In a possible implementation, the first information further includes fourth-type information, the fourth-type information is intent prediction information, and the intent prediction information is used to indicate a driving route of the object on the road within subsequent time.

In a possible implementation, the processing module is configured to determine the driving behavior of the first apparatus based on the first information and the capability of the first apparatus in the following manner:

determining the driving behavior of the first apparatus based on the fourth-type information and the capability of the first apparatus.

In a possible implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

In a possible implementation, the processing module is configured to determine the driving behavior of the first apparatus based on the first information and the capability of the first apparatus in the following manner:

determining the driving behavior of the first apparatus based on the fifth-type information and the capability of the first apparatus.

For technical effects brought by the third aspect or the possible implementations, refer to the descriptions of the technical effects brought by the first aspect or the corresponding implementations.

According to a fourth aspect, a communication apparatus is provided. For example, the communication apparatus is the second apparatus described above. The second apparatus is configured to perform the method according to any one of the second aspect or the possible implementations. Specifically, the second apparatus may include a module configured to perform the method according to any one of the second aspect or the possible implementations. For example, the second apparatus includes a processing module, and optionally may further include a transceiver module. For example, the second apparatus is a communication device. For example, the communication device is a road side device, or a chip disposed in the road side device. Specifically, the processing module is configured to obtain first information, where the first information includes information about a road and/or information about an object on the road, and the object on the road includes a vehicle and/or a pedestrian on the road; and the transceiver module is configured to send the first information, where the first information is used by a first apparatus to determine a driving behavior of the first apparatus.

In a possible implementation, the processing module is configured to obtain the first information in any combination of one or more of the following manners:

obtaining the first information by using a perception apparatus disposed on a road side;

obtaining the first information by using a cloud server; or receiving the first information from the at least one vehicle on the road by using the transceiver module.

In a possible implementation, the first information includes second-type information, the second-type information is digital information, the digital information includes traffic information and/or meteorological information within first duration, the traffic information is used to indicate a traffic accident situation and/or a road construction status within the first duration, and the meteorological information is used to indicate a weather condition within the first duration.

In a possible implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

In a possible implementation, the first information further includes fourth-type information, the fourth-type information is intent prediction information, and the intent prediction information is used to indicate a driving route of the object on the road within subsequent time.

In a possible implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

For technical effects brought by the fourth aspect or the possible implementations, refer to the descriptions of the technical effects brought by the second aspect or the corresponding implementations.

According to a fifth aspect, a communication apparatus is provided. The communication apparatus is, for example, the first apparatus described above. The communication apparatus includes a processor, and optionally, may further include a transceiver. The processor (or the processor coupled to the transceiver) is configured to implement the method described in the first aspect or the possible implementations. For example, the communication apparatus is a communication device, or a chip disposed in the communication device. For example, the communication device is a vehicle-mounted device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. Specifically, the processor is configured to obtain first information, where the first information includes information about a road and/or information about an object on the road, and the object on the road includes a vehicle and/or a pedestrian on the road; and the processor is further configured to determine a driving behavior of the first apparatus based on the first information and a capability of the first apparatus.

In a possible implementation, the first information includes first-type information, and the first-type information includes information about a physical identifier and/or a marking on the road.

In a possible implementation, the processor is configured to determine the driving behavior of the first apparatus based on the first information and the capability of the first apparatus in the following manner:

determining the driving behavior of the first apparatus based on the first-type information and the capability of the first apparatus.

In a possible implementation, the first information further includes second-type information, the second-type information is digital information, the digital information includes road traffic information within first duration, and the road traffic information is used to indicate any combination of one or more of the following: a traffic accident situation within the first duration, and a road construction status within the first duration, or a weather condition within the first duration.

In a possible implementation, the processor is configured to determine the driving behavior of the first apparatus based on the first information and the capability of the first apparatus in the following manner:

determining the driving behavior of the first apparatus based on the second-type information and the capability of the first apparatus.

In a possible implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

In a possible implementation, the processor is configured to determine the driving behavior of the first apparatus based on the first information and the capability of the first apparatus in the following manner:

determining the driving behavior of the first apparatus based on the third-type information and the capability of the first apparatus.

In a possible implementation, the first information further includes fourth-type information, the fourth-type information is intent prediction information, and the intent prediction information is used to indicate a driving route of the object on the road within subsequent time.

In a possible implementation, the processor is configured to determine the driving behavior of the first apparatus based on the first information and the capability of the first apparatus in the following manner:

determining the driving behavior of the first apparatus based on the fourth-type information and the capability of the first apparatus.

In a possible implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

In a possible implementation, the processor is configured to determine the driving behavior of the first apparatus based on the first information and the capability of the first apparatus in the following manner:

determining the driving behavior of the first apparatus based on the fifth-type information and the capability of the first apparatus.

For technical effects brought by the fifth aspect or the possible implementations, refer to the descriptions of the technical effects brought by the first aspect or the corresponding implementations.

According to a sixth aspect, a communication apparatus is provided. The communication apparatus is, for example, the second apparatus described above. The communication apparatus includes a processor and a transceiver. The processor and the transceiver are coupled to each other, and are configured to implement the method described in the second aspect or the possible implementations. For example, the communication apparatus is a communication device, or a chip disposed in the communication device. For example, the communication device is a road side device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component. Specifically, the processor is configured to obtain first information, where the first information includes information about a road and/or information about an object on the road, and the object on the road includes a vehicle and/or a pedestrian on the road; and the transceiver is configured to send the first information, where the first information is used by a first apparatus to determine a driving behavior of the first apparatus.

In a possible implementation, the processor is configured to obtain the first information in any combination of one or more of the following manners:

obtaining the first information by using a perception apparatus disposed on a road side;

obtaining the first information by using a cloud server; or receiving the first information from the at least one vehicle on the road by using the transceiver module.

In a possible implementation, the first information includes second-type information, the second-type information is digital information, the digital information includes traffic information and/or meteorological information within first duration, the traffic information is used to indicate a traffic accident situation and/or a road construction status within the first duration, and the meteorological information is used to indicate a weather condition within the first duration.

In a possible implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

In a possible implementation, the first information further includes fourth-type information, the fourth-type information is intent prediction information, and the intent prediction information is used to indicate a driving route of the object on the road within subsequent time.

In a possible implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

For technical effects brought by the sixth aspect or the possible implementations, refer to the descriptions of the technical effects brought by the second aspect or the corresponding implementations.

According to a seventh aspect, a communication apparatus is provided. The communication apparatus may be the first apparatus in the foregoing method designs. For example, the communication apparatus is a chip disposed in a communication device. For example, the communication device is a vehicle-mounted device. The communication apparatus includes: a memory, configured to store computer-executable program code; and a processor, where the processor is coupled to the memory. The program code stored in the memory includes instructions. When the processor executes the instructions, the communication apparatus is enabled to perform the method in any one of the first aspect or the possible implementations.

The communication apparatus may further include a communication interface. The communication interface may be a transceiver in the first apparatus. For example, the transceiver is implemented by using an antenna, a feeder, a codec, and the like in the communication apparatus. Alternatively, if the communication apparatus is a chip disposed in the first apparatus, the communication interface may be an input/output interface of the chip, for example, an input/output pin.

According to an eighth aspect, a communication apparatus is provided. The communication apparatus may be the second apparatus in the foregoing method designs. For example, the communication apparatus is a chip disposed in a communication device. For example, the communication device is a road side device. The communication apparatus includes: a memory, configured to store computer-executable program code; and a processor, where the processor is coupled to the memory. The program code stored in the memory includes instructions. When the processor executes the instructions, the communication apparatus is enabled to perform the method in any one of the second aspect or the possible implementations.

The communication apparatus may further include a communication interface. The communication interface may be a transceiver in the second apparatus. For example, the transceiver is implemented by using an antenna, a feeder, a codec, and the like in the communication apparatus. Alternatively, if the communication apparatus is a chip disposed in the second apparatus, the communication interface may be an input/output interface of the chip, for example, an input/output pin.

According to a ninth aspect, a communication system is provided. The communication system includes the communication apparatus according to the third aspect, the communication apparatus according to the fifth aspect, or the communication apparatus according to the seventh aspect, and include the communication apparatus according to the fourth aspect, the communication apparatus according to the sixth aspect, or the communication apparatus according to the eighth aspect.

According to a tenth aspect, a computer storage medium is provided. The computer-readable storage medium stores instructions, and when the instructions are run on a computer, the computer is enabled to perform the method according to any one of the first aspect or the possible implementations.

According to an eleventh aspect, a computer storage medium is provided. The computer-readable storage medium stores instructions, and when the instructions are run on a computer, the computer is enabled to perform the method according to any one of the second aspect or the possible implementations.

According to a twelfth aspect, a computer program product including instructions is provided. The computer program product stores the instructions, and when the instructions are run on a computer, the computer is enabled to perform the method according to any one of the first aspect or the possible implementations.

According to a thirteenth aspect, a computer program product including instructions is provided. The computer program product stores the instructions, and when the instructions are run on a computer, the computer is enabled to perform the method according to any one of the second aspect or the possible implementations.

In the embodiments of this application, even if the capability of the first apparatus cannot be used to process complete information of the first information, the first apparatus can still determine the driving behavior of the first apparatus based on a part of information in the first information. This resolves a problem that a capability of an apparatus cannot fully match road side information. According to the technical solutions provided in the embodiments of this application, apparatuses with different capabilities can cooperate with different roads with different capabilities, to improve travel efficiency and safety.

DESCRIPTION OF EMBODIMENTS

Figure 1:
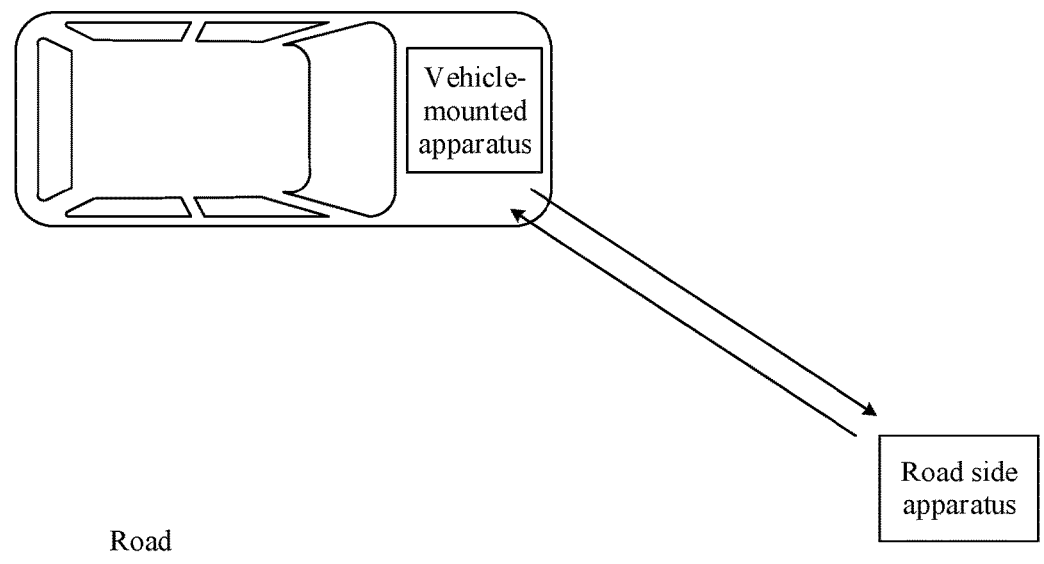
FIG. 1 is a schematic diagram of an application architecture according to an embodiment of this application.

To make this application clearer, the following further describes the embodiments of this application in detail with reference to the accompanying drawings.

(1) Vehicle-mounted apparatus: The vehicle-mounted apparatus, for example, an on board unit (OBU), is usually installed on a vehicle. In an ETC system, a road side unit (RSU) is disposed on a road side. The OBU may communicate with the RSU. For example, the OBU may communicate with the RSU through a microwave. When the vehicle passes through the RSU, the OBU and the RSU may communicate with each other through the microwave. In the electronic toll collection (ETC) system, the OBU establishes a microwave communication link with the RSU by using a dedicated short-range communications (DSRC) technology, to implement, during travel of the vehicle, a process such as vehicle identification or electronic fee deduction of the vehicle without stopping the vehicle.

Alternatively, in addition to the OBU, the vehicle-mounted apparatus may also be another apparatus installed on the vehicle. For example, if various terminal devices described below are located on the vehicle (for example, placed in the vehicle or installed in the vehicle), all the terminal devices may be considered as vehicle-mounted terminal devices, or referred to as vehicle-mounted apparatus.

A terminal device includes a device that provides a user with voice and/or data connectivity, for example, may include a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) communications terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device is a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensor device such as a barcode, radio frequency identification (RFID), a sensor, a global positioning system (GPS), or a laser scanner.

By way of example and not limitation, the terminal device in the embodiments of this application may alternatively be a wearable device. The wearable device may also be referred to as a wearable intelligent device, an intelligent wearable device, or the like, and is a collective term of wearable devices that are intelligently designed and developed for daily wear by using a wearable technology, for example, glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

2. Road side apparatus, for example, an RSU: The RSU may be a fixed infrastructure entity that supports a vehicle-to-everything (V2X) application, and may exchange a message with another entity that supports the V2X application. Alternatively, the road side apparatus may be another apparatus disposed on a road side or at another location.

(3) The terms "system" and "network" may be used interchangeably in the embodiments of this application. "At least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" usually indicates an "or" relationship between associated objects. The term "at least one of the following items (pieces)" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first road and a second road are merely intended to distinguish between different roads, but do not indicate that the two roads have different priorities, different importance degrees, or the like.

The foregoing describes some concepts in the embodiments of this application. The following describes technical features in the embodiments of this application.

Generally, in the embodiments of this application, after obtaining first information, a first apparatus may determine a driving behavior of the first apparatus based on the first information and a capability of the first apparatus. For example, if only a part of information in the first information can be processed based on the capability of the first apparatus, the first apparatus may process this part of information, to determine the driving behavior of the first apparatus. In other words, even if the capability of the first apparatus cannot be used to process complete information of the first information, the first apparatus can still determine the driving behavior of the first apparatus based on a part of information in the first information. This resolves a problem that a capability of an apparatus cannot fully match road side information. According to the technical solutions provided in the embodiments of this application, apparatuses with different capabilities can cooperate with different roads with different capabilities, to improve travel efficiency and safety.

The following describes a network architecture to which an embodiment of this application is applied. FIG. 1 shows a network architecture to which an embodiment of this application is applied.

FIG. 1 includes a vehicle-mounted apparatus and a road side apparatus that may communicate with each other. For example, the vehicle-mounted apparatus and the road side apparatus may communicate with each other through a microwave, or by using another technology. The vehicle-mounted apparatus is carried on a vehicle. For example, one vehicle carries one or more vehicle-mounted apparatuses. In FIG. 1, one vehicle-mounted apparatus and one road side apparatus are used as an example. The vehicle carrying the vehicle-mounted apparatus is driven on a road, and the road side apparatus is, for example, located on a side of the road. Actually, one vehicle-mounted apparatus may communicate with a plurality of road side apparatuses. One road side apparatus may also communicate with a plurality of vehicle-mounted apparatuses. In addition, a location of the vehicle-mounted apparatus on the vehicle, an installation location of the road side apparatus, and the like are merely examples, and do not necessarily represent actual locations.

The following describes the technical solutions in the embodiments of this application with reference to the accompanying drawings.

Figure 2:
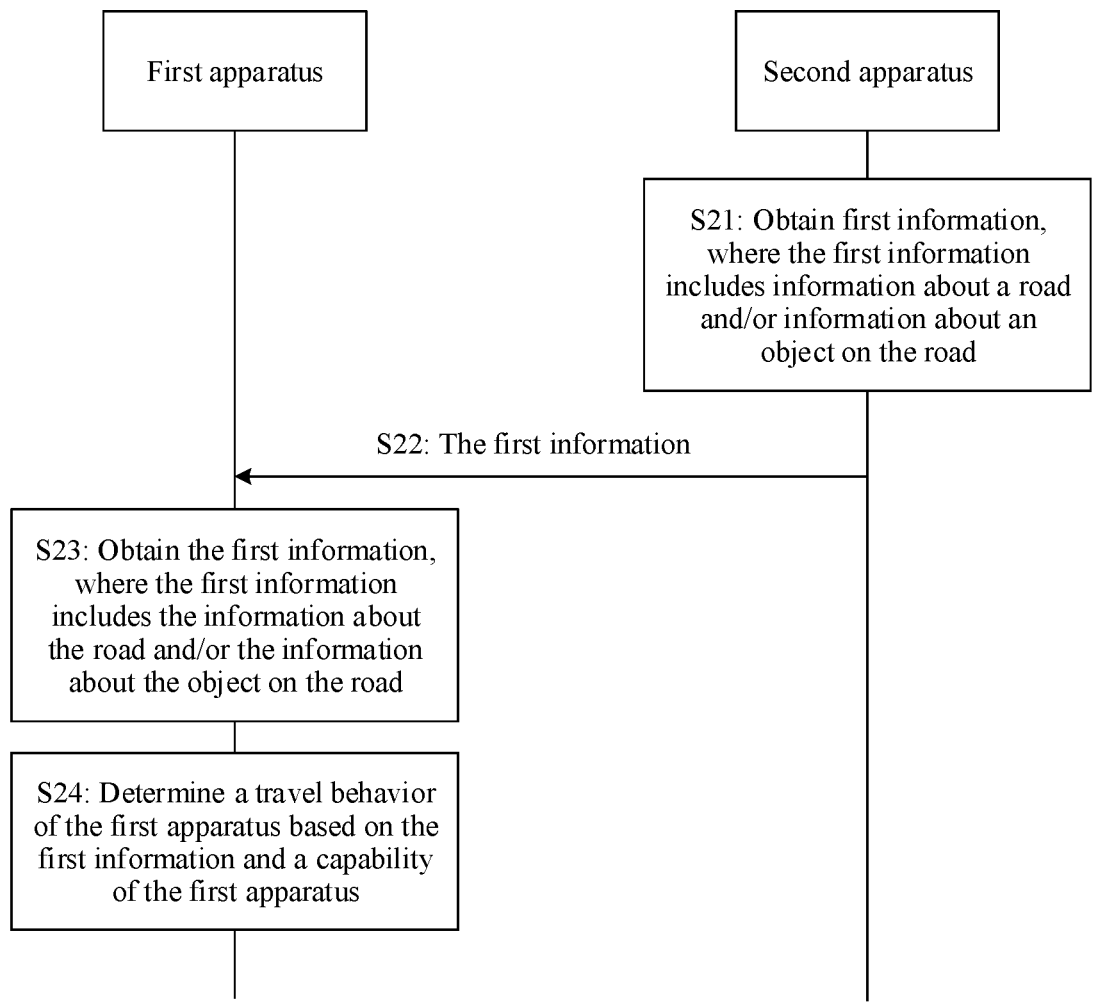
FIG. 2 is a flowchart of a vehicle-to-infrastructure cooperation method according to an embodiment of this application.

An embodiment of this application provides a vehicle-to-infrastructure cooperation method, or the method may also be referred to as a method for obtaining first information, or may also be referred to as an automatic travel method, or the like. FIG. 2 is a flowchart of the method. In the following description process, an example in which the method is applied to the network architecture shown in FIG. 1 is used. In addition, the method may be performed by two communication apparatuses. The two communication apparatuses are, for example, a first communication apparatus and a second communication apparatus. The first communication apparatus or the second communication apparatus may be a vehicle-mounted apparatus or a communication apparatus (for example, a chip system) that can support the vehicle-mounted apparatus in implementing a function required in the method, or may be a road side apparatus or a communication apparatus (for example, a chip system) that can support the road side apparatus in implementing a function required in the method, or certainly may be another communication apparatus. In addition, implementations of the first communication apparatus and the second communication apparatus are not limited. For example, the two communication apparatuses may be implemented in a same form. For example, the two communication apparatuses are implemented in a form of a device. Alternatively, the two communication apparatuses may be implemented in different forms. For example, the first communication apparatus is implemented in a form of a device, and the second communication apparatus is implemented in a form of a chip system.

For ease of description, the following uses an example in which the method is performed by a first apparatus and a second apparatus. In other words, an example in which the first communication apparatus is the first apparatus and the second communication apparatus is the second apparatus is used. The example in which this embodiment is applied to the network architecture shown in FIG. 1 is used. Therefore, the first apparatus described below may be the vehicle-mounted apparatus in the network architecture shown in FIG. 1, and the second apparatus described below may be the road side apparatus in the network architecture shown in FIG. 1. Alternatively, the first apparatus described below may be a complete vehicle, which is not specifically limited.

S21: The second apparatus obtains first information, where the first information includes information about a road and/or information about an object on the road, and the object on the road includes a vehicle and/or a pedestrian on the road.

For example, the second apparatus may obtain the first information in any combination of one or more the following manners:

obtaining, by the second apparatus, the first information by using a perception apparatus disposed on a road side;

obtaining, by the second apparatus, the first information by using a cloud server; or receiving, by the second apparatus, the first information from the at least one vehicle on the road.

For example, the second apparatus may obtain the first information by using the perception apparatus; the second apparatus may obtain the first information by using the cloud server; the second apparatus may receive the first information from the at least one vehicle on the road; or the second apparatus may obtain the first information by using the perception apparatus and the cloud server.

The perception apparatus is, for example, a sensor. The perception apparatus can obtain the information about the road and/or the information about the object on the road. The perception apparatus may be a component of the second apparatus, for example, a functional unit of the second apparatus; or the perception apparatus and the second apparatus may be different apparatuses independent of each other. The perception apparatus can communicate with the second apparatus. Regardless of whether the perception apparatus is the component of the second apparatus, the perception apparatus may be disposed on the second apparatus; or the perception apparatus may be disposed independently of the second apparatus, for example, the perception apparatus may be disposed in a decentralized manner on a road side to collect more abundant information.

The cloud server is, for example, a server disposed in a traffic management department. This is not specifically limited.

If the vehicle has a detection capability, the vehicle may also obtain the information about the road and/or the information about the object on the road through detection. After obtaining the information, the vehicle may also send the obtained information to the second apparatus. The second apparatus may obtain information sent by one or more vehicles on the road. In this case, the information obtained by the second apparatus is comprehensive. The second apparatus then sends the comprehensive information to the vehicle-mounted apparatus (or complete vehicle) on the road, so that the vehicle-mounted apparatus (or complete vehicle) may decide by combining various information on the entire road.

The first information may include the information about the road, or include the information about the object on the road, or include the information about the road and the information about the object on the road. The object on the road may include the vehicle on the road, or include the pedestrian on the road, or include the vehicle and the pedestrian on the road. In addition, the object on the road may further include another object, for example, further includes an animal (for example, a puppy) on the road. This is not specifically limited.

S22: The second apparatus sends the first information, where the first information is used by the first apparatus to determine a driving behavior of the first apparatus.

After obtaining the first information, the second apparatus may send the first information. For example, the second apparatus may send the first information in a broadcast manner. In this case, a plurality of vehicle-mounted apparatuses (or complete vehicles) on the road can all receive the first information, to decide a corresponding driving behavior. In this case, an example in which only one first apparatus thereof receives the first information is used in FIG. 2. Certainly, the second apparatus may alternatively send the first information in a multicast manner or a unicast manner, and a sending manner is not limited.

S23: The first apparatus obtains the first information, where the first information includes the information about the road and/or the information about the object on the road, and the object on the road includes the vehicle and/or the pedestrian on the road.

The first apparatus is, for example, a vehicle-mounted apparatus, an in-vehicle module, an in-vehicle unit, or a complete vehicle. For example, the first apparatus may obtain the first information by performing detection by itself. For example, the first apparatus includes a functional module such as a radar, and the radar may detect surroundings, so as to obtain the first information. Alternatively, the first apparatus may receive the first information from another apparatus. For example, the first apparatus is a vehicle-mounted apparatus, and a communication apparatus is further disposed in a vehicle carrying the vehicle-mounted apparatus. The communication apparatus may receive the first information from the another apparatus, and the communication apparatus may forward the first information to the vehicle-mounted apparatus. Alternatively, a communication unit is further disposed in the first apparatus, and the communication unit may receive the first information from another apparatus, so that the first apparatus obtains the first information. Alternatively, the first apparatus may perform detection by itself, and may receive information from another apparatus. Then, the first information includes information obtained through detection by the first apparatus itself and the information received by the first apparatus. The "another apparatus" described herein includes, for example, one or more of a road side apparatus, a cloud server, or at least one vehicle on a road. For example, the another apparatus includes the second apparatus, or includes the cloud server, or includes the at least one vehicle on the road, or includes the second apparatus and the cloud server, or includes the second apparatus, the cloud server, and the at least one vehicle on the road. The second apparatus is, for example, a road side apparatus. If the first apparatus obtains the first information by receiving the first information from the second apparatus, S22 and S23 may be a same step.

S24: The first apparatus determines the driving behavior of the first apparatus based on the first information and a capability of the first apparatus.

After obtaining the first information, the first apparatus may determine, based on the capability of the first apparatus, which information in the first information can be processed, so as to process the information that can be processed by the first apparatus, to determine the driving behavior of the first apparatus. For example, roads may be classified into different classes, for example, referred to as road classes, and capabilities of vehicle-mounted apparatuses (or complete vehicles) may be classified into different capability classes. The road classes may be in a one-to-one correspondence with the capability classes of the vehicle-mounted apparatuses. For example, the road classes include a first road class (which may also be referred to as a road class 0, and may be represented by using road vehicle (RV) RV-road (R) 0), a second road class (which may also be referred to as a road class 1, and may be represented by using RV-R1), a third road class (which may also be referred to as a road class 2, and may be represented by using RV-R2), a fourth road class (which may also be referred to as a road class 3, and may be represented by using RV-R3), a fifth road class (which may also be referred to as a road class 4, and may be represented by using RV-R4); and the capability classes of the vehicle-mounted apparatuses may include a first capability class (which may also be referred to as a capability class 0, and may be represented by using RV-vehicle (V) 0), a second capability class (which may also be referred to as a capability class 1, and may be represented by using RV-V1), a third capability class (which may also be referred to as a capability class 2, and may be represented by using RV-V2), a fourth capability class (which may also be referred to as a capability class 3, and may be represented by using RV-V3), and a fifth capability class (which may also be referred to as a capability class 4, and may be represented by using RV-V4). RV-R0 may correspond to RV-V0, RV-R1 may correspond to RV-V1, RV-R2 may correspond to RV-V2, RV-R3 may correspond to RV-V3, and RV-R4 may correspond to RV-V4. The correspondence means that a vehicle-mounted apparatus (or complete vehicle) having a capability class can process information sent by a second apparatus (for example, a road side apparatus) on a road of a road class corresponding to the capability class. For example, a vehicle-mounted apparatus having an RV-V1 capability can process information (for example, the first information) sent by a road side apparatus on a road having an RV-R1 capability. Certainly, the classification of the road classes of roads is merely an example. In specific application, there may be fewer than five classes or more than five classes of road classification. Similarly, the classification of the capability classes of vehicle-mounted apparatuses (or complete vehicles) is merely an example. In specific application, there may be fewer than five classes or more than five classes of capability classification.

That the vehicle-mounted apparatus (or complete vehicle) can process a piece of information may mean that the vehicle-mounted apparatus (or complete vehicle) can identify the information, and can determine a driving behavior of the vehicle-mounted apparatus (or complete vehicle) based on the information. For example, if the first information from the road side apparatus is carried in a currently existing message, and the first information is carried in an original field of the message, the vehicle-mounted apparatus can identify the first information. Alternatively, if the first information from the road side apparatus is carried in a currently existing message, and the first information is carried in a newly added field of the message, but the newly added field is known or identifiable to the vehicle-mounted apparatus (or complete vehicle), the vehicle-mounted apparatus (or complete vehicle) can identify the first information. Alternatively, if the first information from the road side apparatus is carried in a new message, but the new message is known or identifiable to the vehicle-mounted apparatus (or complete vehicle), the vehicle-mounted apparatus (or complete vehicle) can identify the first information. However, if the first information is carried in a currently existing message, and the first information is carried in a newly added field of the message, but the newly added field is unknown or unidentifiable to the vehicle-mounted apparatus (or complete vehicle), the vehicle-mounted apparatus (or complete vehicle) cannot identify the first information. Alternatively, if the first information from the road side apparatus is carried in a new message, but the new message is unknown or unidentifiable to the vehicle-mounted apparatus (or complete vehicle), the vehicle-mounted apparatus (or complete vehicle) cannot identify the first information.

That the vehicle-mounted apparatus (or complete vehicle) can identify the first information is used as a prerequisite. If a capability class of the vehicle-mounted apparatus (or complete vehicle) corresponds to a road class of the road on which the road side apparatus is located, in addition to identifying the first information, the vehicle-mounted apparatus (or complete vehicle) may further determine the driving behavior of the vehicle-mounted apparatus (or complete vehicle) based on the first information; and in this case, it is considered that the vehicle-mounted apparatus (or complete vehicle) can process the first information. Alternatively, if a capability class of the vehicle-mounted apparatus (or complete vehicle) does not correspond to a road class of the road on which the road side apparatus is located, for example, the capability class of the vehicle-mounted apparatus (or complete vehicle) is different from a capability class of a vehicle-mounted apparatus (or complete vehicle) corresponding to the road side apparatus (for example, the capability class of the vehicle-mounted apparatus (or complete vehicle) is RV-V0, and the road class of the road on which the road side apparatus is located is RV-R1, and in this case, a capability class of a vehicle-mounted apparatus (or complete vehicle) corresponding to the road class of the road on which the road side apparatus is located should be RV-V1), the vehicle-mounted apparatus (or complete vehicle) can identify the first information, but cannot determine the driving behavior of the vehicle-mounted apparatus based on the first information; this may be considered as that the capability class of the vehicle-mounted apparatus is lower than the capability class of the vehicle-mounted apparatus corresponding to the road class of the road on which the road side apparatus is located, and the vehicle-mounted apparatus of the lower capability class may be incapable of processing information sent by the road side apparatus on the road of the higher road class; and in this case, it is considered that the vehicle-mounted apparatus (or complete vehicle) cannot process the first information. Alternatively, if a capability class of the vehicle-mounted apparatus (or complete vehicle) does not correspond to a road class of the road on which the road side apparatus is located, for example, the capability class of the vehicle-mounted apparatus (or complete vehicle) is different from a capability class of a vehicle-mounted apparatus (or complete vehicle) corresponding to the road side apparatus (for example, the capability class of the vehicle-mounted apparatus (or complete vehicle) is RV-V1, and the road class of the road on which the road side apparatus is located is RV-R0, and in this case, a capability class of a vehicle-mounted apparatus (or complete vehicle) corresponding to the road class of the road on which the road side apparatus is located should be RV-V0); this case may be considered as that the capability class of the vehicle-mounted apparatus (or complete vehicle) is higher than the capability class of the vehicle-mounted apparatus (or complete vehicle) corresponding to the road class of the road on which the road side apparatus is located, and then the vehicle-mounted apparatus (or complete vehicle) of the higher capability class may be capable of processing information sent by the road side apparatus on the road of the lower road class; and in this case, it may be considered that the vehicle-mounted apparatus can process the first information.

An example in which the first information includes information sent by the road side apparatus to the vehicle-mounted apparatus (or complete vehicle). One type of understanding about that a road has a high road class or a low road class may be that content included in the first information is different. If the first information includes many types of information, it may be considered that the road has a high road class. Because the road has the high road class, a road side apparatus disposed on the road can obtain many types of information. Alternatively, if the first information includes few types of information, it may be considered that the road has a low road class. Because the road has the low road class, a road side apparatus disposed on the road can obtain only few types of information. Certainly, "high" or "low" herein is merely an expression for convenient description. Actually, more strictly, it can only be considered that roads have different road classes, but it cannot be considered that a road class is "high" and a road class is "low".

The following describes the first information. It may be understood with reference to FIG. 3.

In a first optional implementation of the first information, the first information may include first-type information. The first-type information is, for example, static information. For example, the first-type information may include first-type sub-information, and the first-type sub-information may include any combination of one or more of the following: a physical identifier disposed on a road, a sign disposed on the road, or a marking on the road. For example, the first-type sub-information includes the physical identifier or the marking on the road, or the first-type sub-information includes the sign disposed on the road, or the first-type sub-information includes the physical identifier and the marking on the road. As described above, the first information may include road information, and then the first-type sub-information belongs to the road information included in the first information. If the first information further includes information about an object on the road, the first-type information may further include second-type sub-information, and the second-type sub-information includes, for example, the information about the object on the road.

Figure 3:
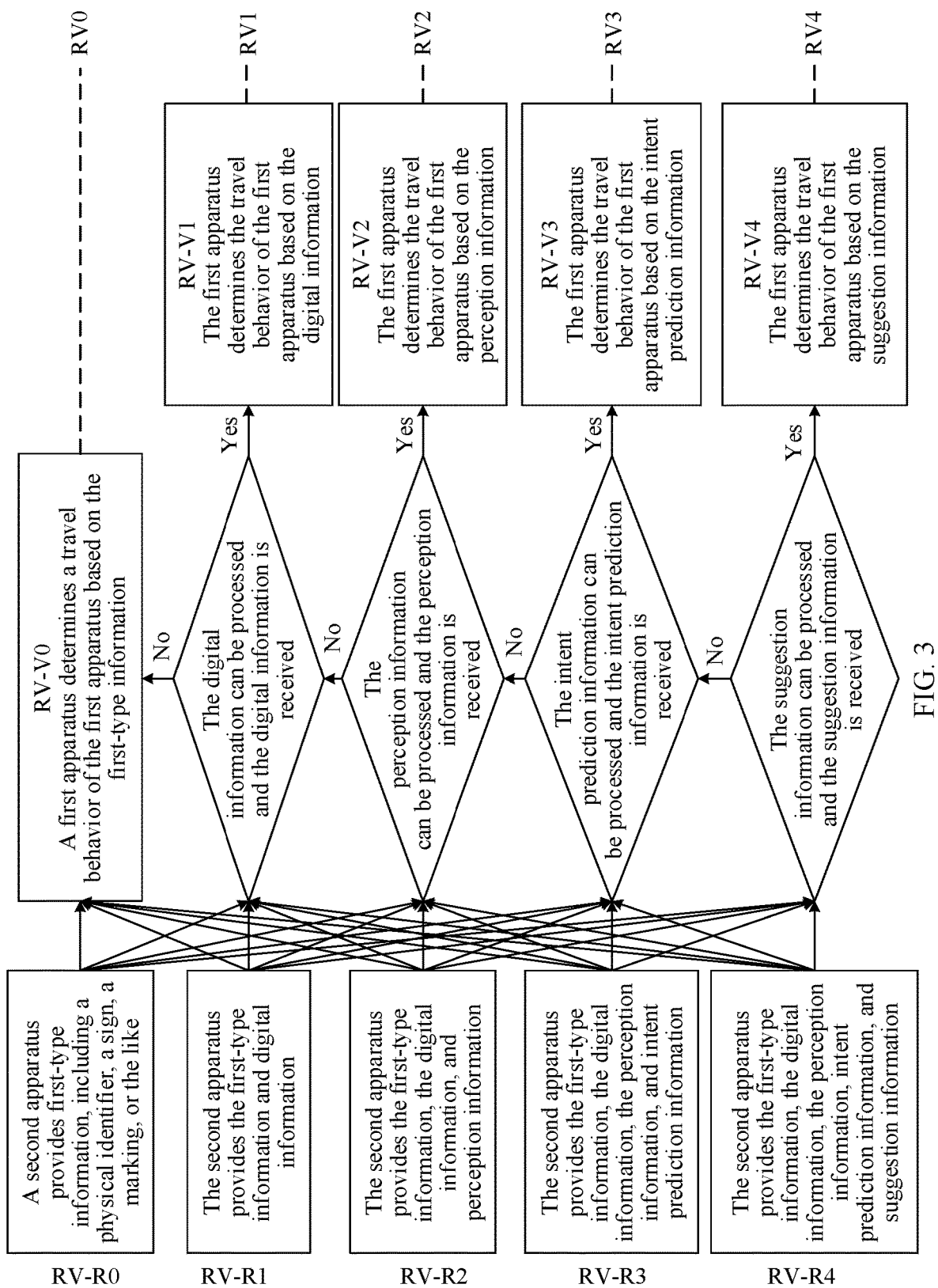
FIG. 3 is a schematic diagram of a vehicle-to-infrastructure cooperation process according to an embodiment of this application.

For example, refer to FIG. 3. The first-type information is sent by a second apparatus to a first apparatus, and then the first-type information may be considered as information corresponding to the road class of RV-R0, in other words, the second apparatus disposed on a road having the road class of RV-R0 may obtain the first-type information. If a road class of a road on which the second apparatus is located is RV-R0, RV-R1, RV-R2, RV-R3, or RV-R4, the second apparatus may obtain the first-type information, and may send the first-type information to the first apparatus.

Figure 4A:
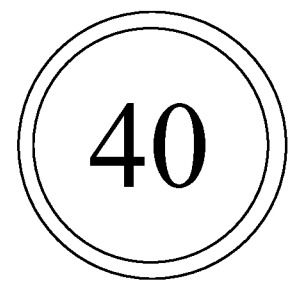
FIG. 4A is a schematic diagram of a sign that is on a road that can be used as first information according to an embodiment of this application.
Figure 4B:
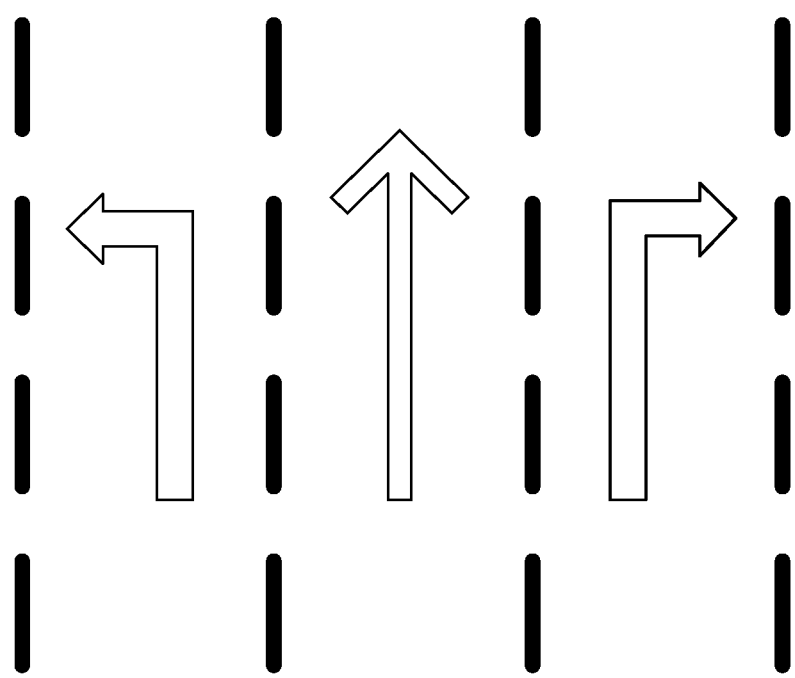
FIG. 4B and FIG. 4C are two schematic diagrams of markings that are on a road and that can be used as first information according to an embodiment of this application.
Figure 4C:
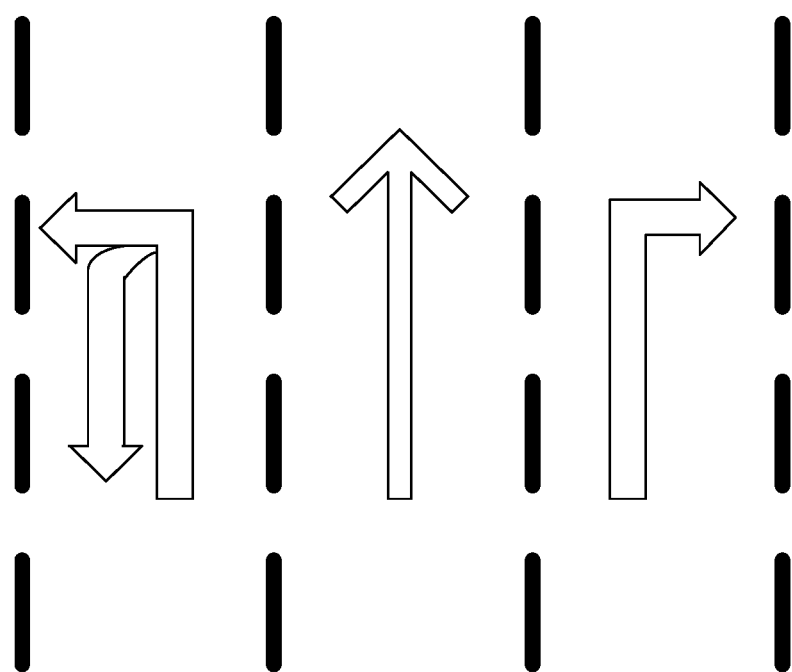

For example, FIG. 4A shows an example of a sign disposed on a road. The sign indicates that a speed is limited to 40 km/h. Information about the sign may be used as content included in the first information. For example, FIG. 4B and FIG. 4C show two markings of a directional travel lane, and information about the two markings may be used as content included in the first information.

If the first information includes the first-type information, because the first-type information is static information and is some physical information disposed on the road, the first apparatus may obtain the first-type information by performing detection by itself, and another apparatus such as a road side apparatus does not need to send the first-type information to the first apparatus. Alternatively, for example, the first apparatus does not have a detection capability, the road side apparatus may obtain the first-type information through detection, and send the first-type information to the first apparatus. This is not specifically limited. If the second apparatus sends the first-type information to the first apparatus, the second apparatus may send the first-type information in a broadcast manner, a multicast manner, or a unicast manner.

The first apparatus may determine a driving behavior of the first apparatus based on the first-type information and a capability of the first apparatus. For example, if the capability class of the first apparatus is RV-V0, RV-V1, RV-V2, RV-V3, or RV-V4, the first apparatus can process the first-type information. For example, if the first-type information includes the information about the sign shown in FIG. 3, the first apparatus may determine that a speed needs to be less than or equal to 40 km/h.

If the capability class of the first apparatus is RV-V0, and the first information includes only the first-type information, a vehicle-to-infrastructure cooperation class in this case may be considered as a first class, for example, represented as RV0. Alternatively, if the capability class of the first apparatus is RV-V1, RV-V2, RV-V3, or RV-V4, and the first information includes only the first-type information, a vehicle-to-infrastructure cooperation class in this case may also be considered as a first class. Alternatively, if the capability class of the first apparatus is RV-V0, and the first information includes other information in addition to the first-type information, a vehicle-to-infrastructure cooperation class in this case may also be considered as a first class.

In a second optional implementation of the first information, the first information may include first-type information and second-type information. The second-type information is, for example, digital information. For example, the second-type information includes third-type sub-information, the third-type sub-information may include road traffic information within first duration, and the road traffic information may be used to indicate any combination of one or more of the following: a traffic accident situation within the first duration, a road construction status within the first duration, or a weather condition within the first duration. For example, the road traffic information may indicate the traffic accident situation within the first duration, or the road traffic information may indicate the road construction status within the first duration, or the road traffic information may indicate the weather condition within the first duration, or the road traffic information may indicate the traffic accident situation and the road construction status that are within the first duration, or the road traffic information may indicate the traffic accident situation, the road construction status, and the weather condition that are within the first duration. The first duration is, for example, one day, one week, one month, or the like. The first duration may be configured by a first apparatus or configured by a second apparatus. A traffic accident includes, for example, a vehicle-to-vehicle collision accident or a person-to-vehicle collision accident, the road construction status includes, for example, road occupation construction information or road blocking information, and the weather condition includes, for example, rainstorm weather or strong wind weather. As described above, the first information may include road information, and then the second-type sub-information belongs to the road information included in the first information. If the first information further includes information about an object on a road, the second-type information may further include fourth-type sub-information, the fourth-type sub-information includes, for example, the information about the object on the road, and the fourth-type sub-information may also be digital information.

For example, refer to FIG. 3. The second-type information is sent by the second apparatus to the first apparatus, and then the second-type information may be considered as information corresponding to the road class of RV-R1, in other words, the second apparatus disposed on a road having the road class of RV-R1 may obtain the second-type information. Alternatively, if a road class of a road on which the second apparatus is located is RV-R2, RV-R3, or RV-R4, the second apparatus may obtain the second-type information, and may send the second-type information to the first apparatus. If the second apparatus sends the second-type information to the first apparatus, the second apparatus may send the second-type information in a broadcast manner, a multicast manner, or a unicast manner.

Figure 5:
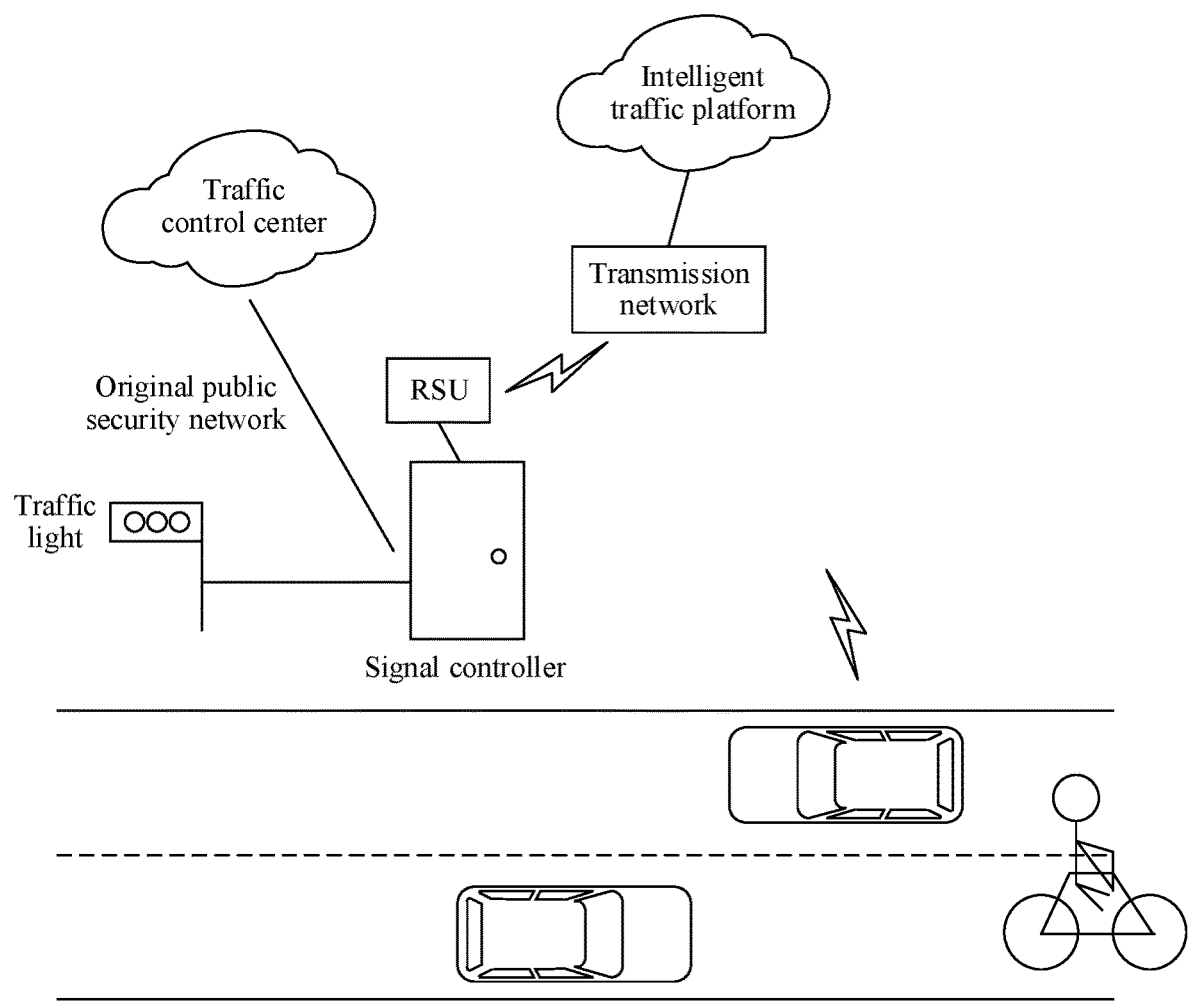
FIG. 5 is a schematic diagram of obtaining digital information by a second apparatus according to an embodiment of this application.

The second-type information is digital information. For example, FIG. 5 shows an example in which the second apparatus obtains the second-type information. In FIG. 5, the second apparatus may communicate with a device such as a signal controller and a traffic control center. The traffic control center may communicate with an intelligent traffic platform. The intelligent traffic platform may be connected to a transmission network, so that the traffic control center may obtain some digital information. In this case, the second apparatus may obtain the second-type information by using the traffic control center and the signal controller. In FIG. 5, an RSU is used as an example of the second apparatus. For example, the signal controller may be connected to a traffic light on a road. The traffic control center and the traffic light may each be considered as a type of cloud server. In other words, the manner shown in FIG. 5 is an example in which the second apparatus obtains the second-type information by using the cloud server.

Certainly, the second-type information may alternatively be obtained through detection by the first apparatus itself, or may be obtained by using another apparatus such as a vehicle.

The first apparatus may determine a driving behavior of the first apparatus based on the second-type information and a capability of the first apparatus. For example, if the capability class of the first apparatus is RV-V1, RV-V2, RV-V3, or RV-V4, the first apparatus can process the second-type information. For example, if the second-type information includes rainstorm information, the first apparatus may determine that a speed needs to be reduced; or if the second-type information includes the road blocking information, the first apparatus may determine that a change to another road is required. However, if the capability class of the first apparatus is RV-V0, the first apparatus cannot process the second-type information. If the capability class of the first apparatus is RV-V0, and the first information includes the first-type information and the second-type information, the first apparatus may process the first-type information to determine the driving behavior of the first apparatus without processing the second-type information. It can be learned that even if the capability class of the first apparatus does not match the road class of the road on which the second apparatus that sends the first information is located, the first apparatus may process a part of information included in the first information.

If the capability class of the first apparatus is RV-V1, and the first information includes only the first-type information and the second-type information, a vehicle-to-infrastructure cooperation class in this case may be considered as a second class, for example, represented as RV1. Alternatively, if the capability class of the first apparatus is RV-V2, RV-V3, or RV-V4, and the first information includes only the first-type information and the second-type information, a vehicle-to-infrastructure cooperation class in this case may also be considered as a second class. Alternatively, if the capability class of the first apparatus is RV-V1, and the first information includes other information in addition to the first-type information and the second-type information, a vehicle-to-infrastructure cooperation class in this case may also be considered as a second class.

It should be noted that, because the second apparatus may send a type of information in a broadcast manner, the type of information may include a plurality of types of information. For example, different vehicle-mounted apparatuses may support different specific functions when having a same capability class. For example, a vehicle-mounted apparatus 1 is dedicated to cruising, and a vehicle-mounted apparatus 2 is dedicated to platooning travel; capability classes of the vehicle-mounted apparatus 1 and the vehicle-mounted apparatus 2 are both RV-V1, but a specific function supported by the vehicle-mounted apparatus 1 is different from a specific function supported by the vehicle-mounted apparatus 2. In this case, for a same type of information, content utilized by the vehicle-mounted apparatus 1 may be different from content utilized by the vehicle-mounted apparatus 2. Therefore, in this specification, that the first apparatus can process a type of information does not necessarily mean that the first apparatus can process all information included in the type of information. Provided that the first apparatus can process a part of information included in the type of information, it is considered that the first apparatus can process the type of information. However, if the capability class of the first apparatus is lower than a capability class corresponding to the road class of the road on which the second apparatus that sends a type of information is located, the first apparatus cannot process the type of information. Therefore, that the first apparatus cannot process the type of information may be understood as that the first apparatus cannot process all information included in the type of information. For example, the vehicle-mounted apparatus 1 is dedicated to cruising, the vehicle-mounted apparatus 2 is dedicated to platooning travel, and the capability classes of the vehicle-mounted apparatus 1 and the vehicle-mounted apparatus 2 are both RV-V1. In this case, both the vehicle-mounted apparatus 1 and the vehicle-mounted apparatus 2 can process the second-type information (where the first-type information can also be processed, but information that matches the capability class is mainly described herein). However, the vehicle-mounted apparatus 1 may be capable of processing information 1 included in the second-type information, the vehicle-mounted apparatus 2 may be capable of processing information 2 included in the second-type information, and the information 1 and the information 2 may be partially or completely different. However, both the vehicle-mounted apparatus 1 and the vehicle-mounted apparatus 2 are considered capable of processing the second-type information. The following description that the first apparatus can process a type of information also has a similar meaning, and details are not described in the following again.

In a third optional implementation of the first information, the first information may include first-type information, second-type information, and third-type information. The third-type information is, for example, perception information. For example, the third-type information includes information about a road and/or information about an object on the road. Specifically, the third-type information includes the information about the road or the information about the object on the road, or the third-type information includes the information about the road and the information about the object on the road. The information about the road included in the third-type information is, for example, referred to as fifth-type sub-information. The fifth-type sub-information includes real-time status information of the road obtained in a perception manner. The information about the object on the road included in the third-type information is, for example, referred to as sixth-type sub-information. The sixth-type sub-information includes, for example, real-time information about a vehicle on the road and/or real-time information about a pedestrian on the road that are/is obtained in the perception manner. Specifically, the sixth-type sub-information includes, for example, the real-time information about the vehicle on the road or the real-time information about the pedestrian on the road that is obtained in the perception manner. Alternatively, the sixth-type sub-information includes, for example, the real-time information about the vehicle on the road and the real-time information about the pedestrian on the road that are obtained in the perception manner.

The perception information is, for example, information obtained by a perception apparatus disposed on the road, and is therefore referred to as perception information. The perception apparatus includes, for example, an apparatus such as a camera or a street lamp. Alternatively, at least one vehicle may send detected information to the second apparatus, the second apparatus performs combination processing to obtain perception information, and then the second apparatus sends the perception information to a first apparatus.

For example, refer to FIG. 3. The third-type information is sent by a second apparatus to a first apparatus, and then the third-type information may be considered as information corresponding to the road class of RV-R2, in other words, the second apparatus disposed on a road having the road class of RV-R2 may obtain the third-type information. Alternatively, if a road class of a road on which the second apparatus is located is RV-R3 or RV-R4, the second apparatus may obtain the third-type information, and may send the third-type information to the first apparatus. If the second apparatus sends the third-type information to the first apparatus, the second apparatus may send the third-type information in a broadcast manner, a multicast manner, or a unicast manner.

Figure 6:
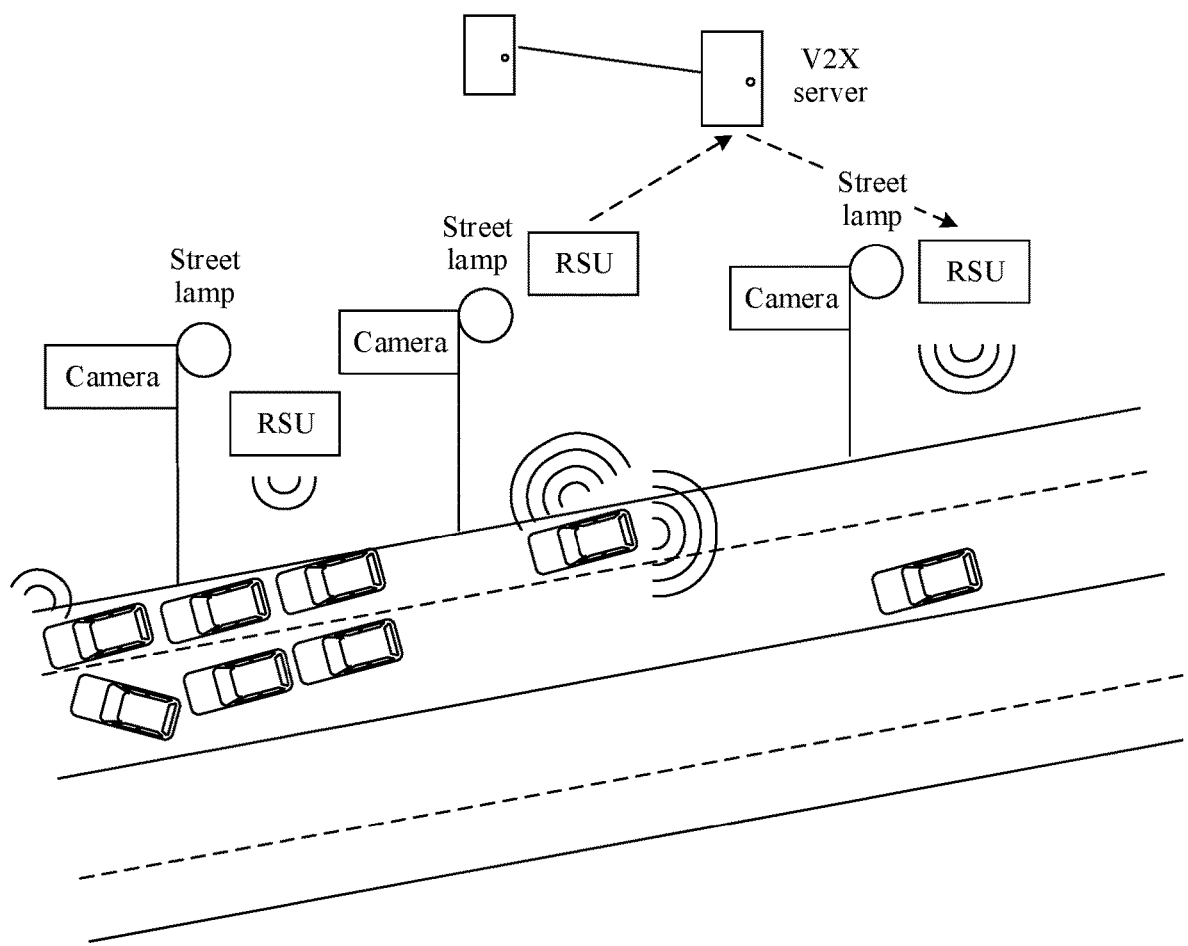
FIG. 6 is a schematic diagram of obtaining perception information by a second apparatus according to an embodiment of this application.

The third-type information is perception information. For example, FIG. 6 shows an example in which the second apparatus obtains the third-type information. In FIG. 6, the second apparatus may communicate with a perception apparatus, and the perception apparatus includes, for example, a camera and a street lamp in FIG. 6. The perception apparatus may send obtained information to the second apparatus. Each perception apparatus may send obtained information to a corresponding second apparatus. In this case, the second apparatus may obtain the third-type information. The second apparatus corresponding to the perception apparatus may be a second apparatus that can communicate with the perception apparatus. Generally, the perception apparatus and the second apparatus may be in a one-to-one correspondence. Certainly, one second apparatus may correspond to one or more perception apparatuses, and types or quantities of perception apparatuses corresponding to different second apparatuses may be the same or may be different. FIG. 6 is merely an example in which three second apparatuses each correspond to two perception apparatuses, and the two perception apparatuses are a camera and a street lamp. In addition, in FIG. 6, an example in which the three second apparatuses are disposed on a road is used. In actual application, one or more second apparatuses may be disposed on one road, and a quantity of second apparatuses is not limited. In addition, the second apparatuses may also communicate with each other. For example, a plurality of second apparatuses are disposed on one road, and it may be specified that one of the second apparatuses is a primary second apparatus, and other second apparatuses all send obtained perception information to the primary second apparatus. The primary second apparatus may obtain final perception information by combining the perception information, and then send the final perception information to the first apparatus. In this way, the first apparatus directly receives the perception information by using one second apparatus, and does not need to receive information from excessively many second apparatuses, so that the received information is complete. For example, the second apparatuses may communicate with each other in a V2X manner. In FIG. 6, an example in which two second apparatuses communicate with each other in the V2X manner is used. In addition, in FIG. 6, RSUs are used as examples of the second apparatuses.

Certainly, the third-type information may alternatively be obtained through detection by the first apparatus itself, or may be obtained by using another apparatus such as a vehicle.

The first apparatus may determine a driving behavior of the first apparatus based on the third-type information and a capability of the first apparatus. For example, if the capability class of the first apparatus is RV-V2, RV-V3, or RV-V4, the first apparatus can process the third-type information. For example, at an intersection of a common road, the second apparatuses send the third-type information to the first apparatus, where the third-type information includes vehicle information of the intersection and pedestrian information of the intersection. After the first apparatus receives the third-type information, a field of view that is at the intersection and that is of a vehicle in which the first apparatus is located is equivalently extended, avoiding a visual blind area as much as possible, and improving travel safety. Alternatively, for example, when a vehicle in which the first apparatus is located travels to the vicinity of a special road section area (for example, a school or a construction area), the second apparatuses send the third-type information to the first apparatus, where the third-type information includes, for example, accident information of a road or congestion information of the road, and the road may be a road that the vehicle in which the first apparatus is located is about to enter. In this case, the first apparatus can predict in advance a status of the road that the vehicle is about to enter, so that the driving behavior of the first apparatus determined by the first apparatus is more proper. However, if the capability class of the first apparatus is RV-V0 or RV-R1, the first apparatus cannot process the third-type information.

If the capability class of the first apparatus is RV-V2, and the first information includes only the first-type information, the second-type information, and the third-type information, a vehicle-to-infrastructure cooperation class in this case may be considered as a third class, for example, represented as RV2. Alternatively, if the capability class of the first apparatus is RV-V3 or RV-V4, and the first information includes only the first-type information, the second-type information, and the third-type information, a vehicle-to-infrastructure cooperation class in this case may also be considered as a third class. Alternatively, if the capability class of the first apparatus is RV-V4, and the first information includes other information in addition to the first-type information, the second-type information, and the third-type information, a vehicle-to-infrastructure cooperation class in this case may also be considered as a third class.

In a fourth optional implementation of the first information, the first information may include first-type information, second-type information, third-type information, and fourth-type information. The fourth-type information includes, for example, intent prediction information. For example, the intent prediction information may be used to indicate a driving route of an object on a road within subsequent time. As described above, the first information may include information about the object on the road. In this case, the intent prediction information included in the fourth-type information belongs to the information about the object on the road included in the first information. In this case, the fourth-type information may further include road information. For example, the intent prediction information may indicate a driving route of a vehicle on the road within subsequent time, or may indicate a driving route of a pedestrian on the road within subsequent time, or may indicate driving routes of a vehicle and a pedestrian on the road within subsequent time.

For example, refer to FIG. 3. The fourth-type information is sent by a second apparatus to a first apparatus, and then the fourth-type information may be considered as information corresponding to the road class of RV-R3, in other words, the second apparatus disposed on a road having the road class of RV-R3 may obtain the fourth-type information. Alternatively, if a road class of a road on which the second apparatus is located is RV-R4, the second apparatus may obtain the fourth-type information, and may send the fourth-type information to the first apparatus. If the second apparatus sends the fourth-type information to the first apparatus, the second apparatus may send the fourth-type information in a broadcast manner, a multicast manner, or a unicast manner.

Certainly, the fourth-type information may alternatively be obtained through detection by the first apparatus itself, or may be obtained by using another apparatus such as a vehicle.

The first apparatus may determine a driving behavior of the first apparatus based on the fourth-type information and a capability of the first apparatus. For example, if the capability class of the first apparatus is RV-V3 or RV-V4, the first apparatus can process the fourth-type information. For example, at an intersection of a common road, the second apparatus may send intent prediction information to the first apparatus, where the intent prediction information includes a travel intent of another vehicle at the intersection. In this case, the first apparatus may determine the driving behavior of the first apparatus based on the intent prediction information, for example, may determine a driving route of the first apparatus based on a driving route of another object, so that the first apparatus does not collide with the another vehicle. By using the intent prediction information, determining and decision time of the first apparatus can be shortened, determining accuracy is improved, and driving safety is finally improved. However, if the capability class of the first apparatus is RV-V0, RV-V1, or RV-V2, the first apparatus cannot process the fourth-type information.

If the capability class of the first apparatus is RV-V3, and the first information includes only the first-type information, the second-type information, the third-type information, and the fourth-type information, a vehicle-to-infrastructure cooperation class in this case may be considered as a fourth class, for example, represented as RV3. Alternatively, if the capability class of the first apparatus is RV-V4, and the first information includes only the first-type information, the second-type information, the third-type information, and the fourth-type information, a vehicle-to-infrastructure cooperation class in this case may also be considered as a fourth class. Alternatively, if the capability class of the first apparatus is RV-V4, and the first information includes other information in addition to the first-type information, the second-type information, the third-type information, and the fourth-type information, a vehicle-to-infrastructure cooperation class in this case may also be considered as a fourth class.

In a fifth optional implementation of the first information, the first information may include first-type information, second-type information, third-type information, fourth-type information, and fifth-type information. The fifth-type information includes, for example, suggestion information. For example, the suggestion information is used to indicate any combination of one or more of the following: a driving route planned for a first vehicle, driving time planned for the first vehicle, or a speed planned for the first vehicle. For example, the suggestion information may indicate the driving route planned for the first vehicle, or the suggestion information may indicate the driving time planned for the first vehicle, or the suggestion information may indicate the speed planned for the first vehicle, or the suggestion information may indicate the driving route planned for the first vehicle and the driving time planned for the first vehicle (for example, it is suggested that the first vehicle travel along the driving route within the driving time), or the suggestion information may indicate the driving route planned for the first vehicle, the driving time planned for the first vehicle, and the speed planned for the first vehicle (for example, it is suggested that the first vehicle travel along the driving route at the speed within the driving time). The first vehicle is a vehicle in which a first apparatus is located, or the first vehicle is a first apparatus itself. As described above, the first information may include information about an object on a road. In this case, the suggestion information included in the fifth-type information belongs to the information about the object on the road included in the first information. In this case, the fifth-type information may further include road information.

For example, refer to FIG. 3. The fifth-type information is sent by a second apparatus to the first apparatus, and then the fifth-type information may be considered as information corresponding to the road class of RV-R4, in other words, the second apparatus disposed on a road having the road class of RV-R4 may obtain the fifth-type information. If the second apparatus sends the fifth-type information to the first apparatus, the second apparatus may send the fifth-type information in a broadcast manner, a multicast manner, or a unicast manner.

Certainly, the fifth-type information may alternatively be obtained by the first apparatus itself, or may be obtained by using another apparatus such as a vehicle.

The first apparatus may determine a driving behavior of the first apparatus based on the fifth-type information and a capability of the first apparatus. For example, if the capability class of the first apparatus is RV-V4, the first apparatus can process the fifth-type information. For example, in high-speed ramp merging, the second apparatus may control vehicles on an arterial road and a merging lane in a coordinated manner, and the second apparatus may provide suggestion information for one or more vehicles. For example, the second apparatus may separately send suggestion information to different first apparatuses in a unicast manner. In this way, the second apparatus may be similar to a virtual traffic officer. The first apparatus may determine the driving behavior of the first apparatus based on the suggestion information from the second apparatus. For example, the first apparatus may directly travel based on an indication of the suggestion information, or the first apparatus may further comprehensively determine a driving route of the first apparatus with reference to another factor, so that merging can be performed efficiently and safely. However, if the capability class of the first apparatus is RV-V0, RV-V1, RV-V2, or RV-V3, the first apparatus cannot process the fifth-type information.

If the capability class of the first apparatus is RV-V4, and the first information includes only the first-type information, the second-type information, the third-type information, the fourth-type information, and the fifth-type information, a vehicle-to-infrastructure cooperation class in this case may be considered as a fifth class, for example, represented as RV4. Alternatively, if the capability class of the first apparatus is RV-V4, and the first information includes other information in addition to the first-type information, the second-type information, the third-type information, the fourth-type information, and the fifth-type information, a vehicle-to-infrastructure cooperation class in this case may also be considered as a fifth class.

For ease of understanding, the following describes the technical solutions provided in the embodiments of this application by using examples with reference to several scenarios. In the following example process, an example in which the first apparatus is a vehicle-mounted apparatus and the second apparatus is a road side apparatus is used.

For example, a road class of a road is RV-R3, and a road side apparatus disposed on the road may provide intent prediction information for a vehicle-mounted apparatus. In this case, a vehicle travels on the road, and the vehicle-mounted apparatus disposed on the vehicle may receive the intent prediction information from the road side apparatus. In addition, the vehicle-mounted apparatus may determine a driving behavior of the vehicle with reference to information such as the intent prediction information, perception information, and a physical identifier that is on the road.

In addition to providing first-type information and second-type information, the road side apparatus further provides the intent prediction information. The intent prediction information may indicate one or more driving routes of one or more objects on the road within subsequent time, for example, may indicate one or more driving routes of one or more vehicles on the road within subsequent time, or may indicate one or more driving routes of one or more pedestrians on the road within subsequent time, or may indicate one or more driving routes of one or more vehicles on the road within subsequent time, and indicate one or more driving routes of one or more pedestrians on the road within subsequent time. The intent prediction information may be sent by a vehicle on the road to the road side apparatus. For example, some vehicles may plan driving routes of the vehicles within subsequent time, and may send the planned driving routes to the road side apparatus. Alternatively, the intent prediction information may be obtained by the road side apparatus based on an analysis of historical motion data of an object on the road. The vehicle-mounted apparatus may determine a driving route of the vehicle with reference to the intent prediction information. In this way, intent determining accuracy is improved, and driving safety can be further improved.

For example, refer to Table 1. Content, an information generation manner, and the like of fourth-type information are described by using an example.

TABLE 1

| RV3 | Information content | Information generation manner | Information exchange manner | Information user |
|---|---|---|---|---|
| Road -> Vehicle | A road side apparatus provides intent prediction information (for example, a travel track). The intent prediction information may be information obtained by the road side apparatus by synthesizing an intent notified by a vehicle and a predicted intent of a pedestrian or an unconnected vehicle. The intent prediction information may include any combination of one or more of the following: (1) Target attribute, for example, a person, a vehicle, or a non-motor vehicle; (2) Direction of a travel angle; (3) Turn signal; or (4) Travel intent, for example, including an identity (ID) of a target road and a lane number of the target road. | Including any combination of one or more of the following: 1. A road side perception apparatus (for example, a sensor) perceives information about a vehicle or a pedestrian, and performs intent prediction, where the perception apparatus is, for example, a radar, a camera, a laser radar, or a meteorological instrument. 2. The road side apparatus obtains the intent prediction information from another device, for example, from a device such as a cloud server, a traffic control center, or a signal controller. 3. The road side apparatus obtains the intent prediction information from vehicles on the road, and then the road side apparatus comprehensively processes the intent prediction information of the plurality of vehicles, and sends the intent prediction information to a vehicle-mounted apparatus. | For example, V2X | 1. Human driver; 2. Autonomous vehicle; or 3. Traffic management department. |

The following describes application of the fourth-type information in several different scenarios.

Figure 7:
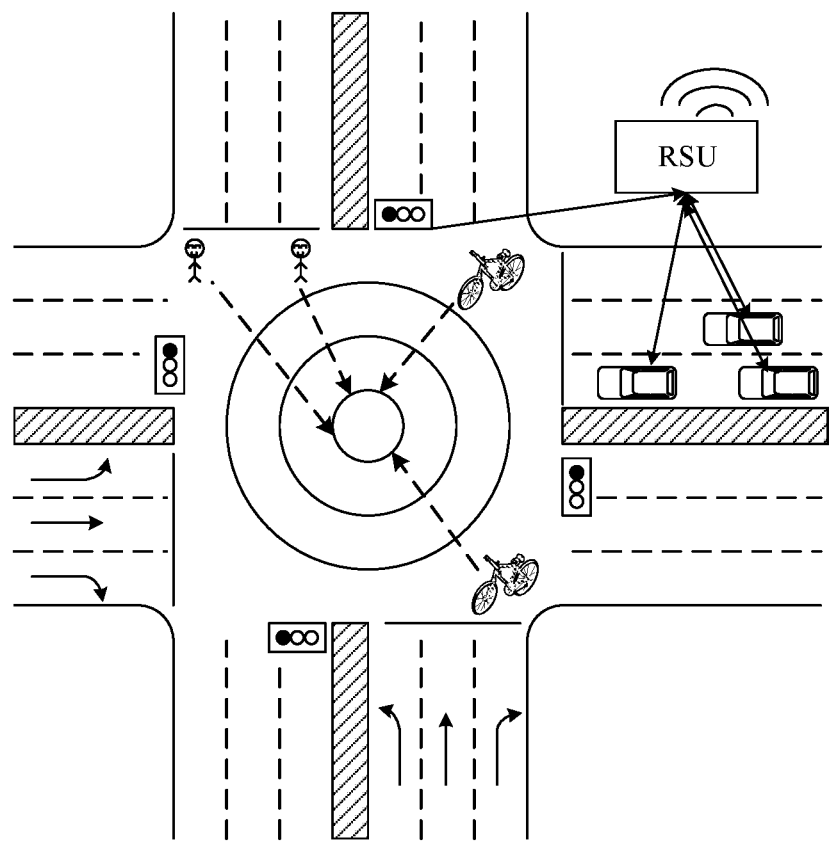
FIG. 7 is a schematic diagram of applying a method according to an embodiment of this application to an urban road intersection scenario.

1. A first scenario is travel at an urban road intersection. For a schematic diagram of this scenario, refer to FIG. 7. In FIG. 7, an example in which a road side apparatus is an RSU is used.

For example, a vehicle travels to the intersection, and if a vehicle-mounted apparatus carried in the vehicle can communicate with the RSU, the vehicle-mounted apparatus may send travel information of the vehicle to the RSU, and the RSU may obtain the travel information of the vehicle. For example, the RSU may obtain travel information of at least one vehicle. The travel information includes, for example, one or more of a location of the vehicle, a speed of the vehicle, an acceleration of the vehicle, or travel intent information of the vehicle (for example, a driving route planned for the vehicle by the vehicle-mounted apparatus). For example, refer to Table 2. The travel information may include one or more of information in Table 2.

TABLE 2

| Data | Remarks |
| --- | --- |
| Moment | |
| Location (longitude and latitude) | |
| Location (elevation) | |
| Head direction angle | |
| Body size (length, width, or height) | |
| Speed | |
| Three-axis acceleration | |
| Yawing angular acceleration | |
| Turn signal | |
| Steering wheel angle | |
| Travel intent | Including an ID of a target road or a lane number of the target road |

For example, the travel information includes a location (longitude and latitude), or the travel information includes a travel intent and a turn signal, or the travel information includes a speed, a three-axis acceleration, a vehicle body size, and a travel intent.

A perception apparatus disposed on a road side may obtain information about a location, a speed, or an acceleration of each type of traffic participant (such as a vehicle or a pedestrian) at the intersection, and in addition, the perception apparatus may further obtain information about a traffic light disposed at the intersection, obtain information about a road status of the intersection, or the like. The perception apparatus may send all the obtained information to the RSU. The RSU may comprehensively process the received information, for example, perform motion information vectorization processing on the received information, so as to predict a motion track of an object on the road based on information obtained after the motion information vectorization processing, that is, obtain intent prediction information. After obtaining the intent prediction information, the RSU may send the intent prediction information to a vehicle-mounted apparatus of a vehicle that is about to enter the road section, or may send the intent prediction information to a vehicle-mounted apparatus of a vehicle that is passing through the road section. For example, the RSU may send the intent prediction information to vehicle-mounted apparatus of three vehicles shown on a right side of FIG. 7. For example, the RSU may send the intent prediction information in a broadcast manner, a multicast manner, or a unicast manner.

After receiving the intent prediction information, the vehicle-mounted apparatus may determine, with reference to the intent prediction information, a driving behavior of the vehicle in which the vehicle-mounted apparatus is located. For example, if the vehicle-mounted apparatus determines, based on the intent prediction information, that a vehicle travels to the right, the vehicle-mounted apparatus may control the vehicle in which the vehicle-mounted apparatus is located not to travel to the right. Alternatively, the vehicle-mounted apparatus may control the vehicle in which the vehicle-mounted apparatus is located to avoid a driving route of another vehicle as much as possible, so as to prevent a collision.

It can be learned from the first application scenario that the technical solutions provided in the embodiments of this application are applicable to travel at an intersection of common roads and highways in a city, a suburb, or a closed park, an expressway entrance, an intersection without a traffic light, or the like.

Figure 8:
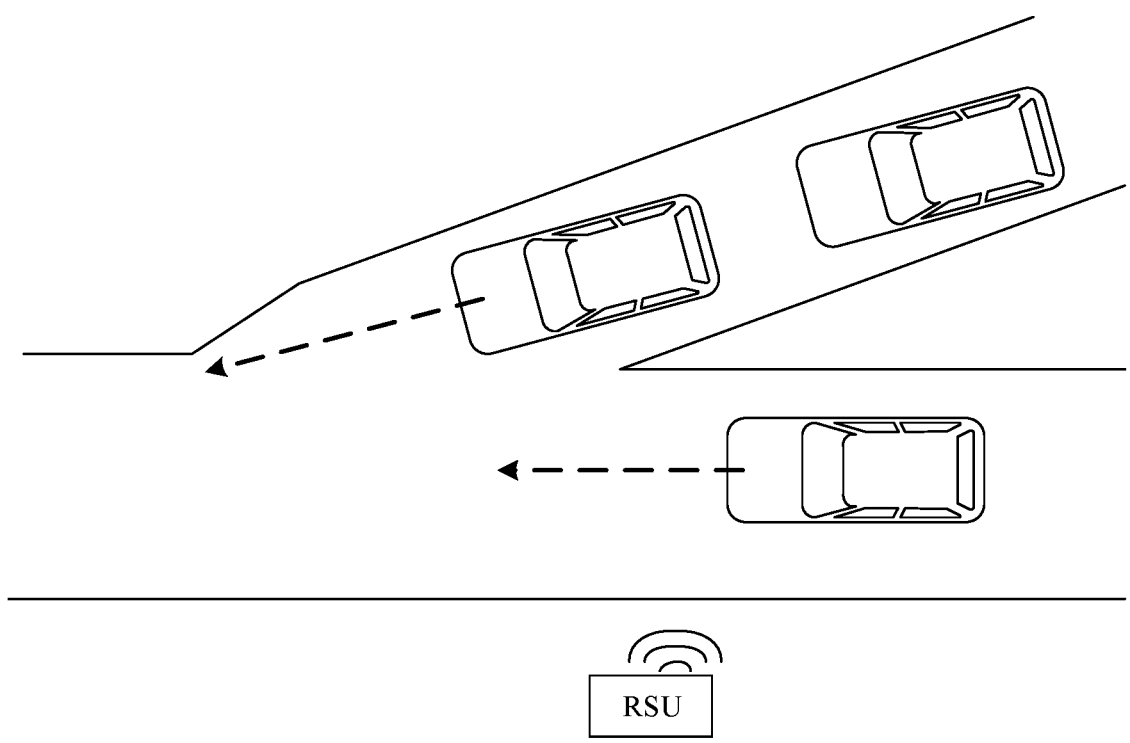
FIG. 8 is a schematic diagram of applying a method according to an embodiment of this application to a high-speed ramp merging scenario.

2. A second scenario is high-speed ramp merging. For a schematic diagram of this scenario, refer to FIG. 8. In FIG. 8, an example in which a road side apparatus is an RSU is used.

For example, in FIG. 8, a vehicle needs to perform merging in a travel process. A vehicle-mounted apparatus of the vehicle may send travel information of the vehicle to the RSU, and the RSU may obtain the travel information of the vehicle. For example, the RSU may obtain travel information of at least one vehicle. The travel information of the vehicle includes, for example, one or more of a location of the vehicle, a speed of the vehicle, an acceleration of the vehicle, or merging intent information of the vehicle. For example, for the travel information, refer to Table 2. When the RSU receives the travel information from the vehicle or detects that the vehicle enters a merging area, the RSU may obtain intent prediction information of the vehicle. For example, the RSU may obtain intent prediction information of the at least one vehicle, and then the RSU may broadcast the intent prediction information of the at least one vehicle. After receiving intent prediction information of another vehicle or pedestrian, the vehicle-mounted apparatus may determine, with reference to the intent prediction information, a driving behavior of the vehicle in which the vehicle-mounted apparatus is located. For example, if the vehicle-mounted apparatus determines, based on the intent prediction information, that a vehicle is to perform a lane change, the vehicle-mounted apparatus may control the vehicle in which the vehicle-mounted apparatus is located to remain unchanged temporarily, so as to prevent a collision. An occasion on which the RSU sends the intent prediction information may ensure as much as possible that after receiving the intent prediction information, the vehicle-mounted apparatus has plenty of time to take a measure to prevent a collision, so that the vehicle that needs to perform a lane change can successfully implement a lane change action. According to the method provided in the embodiments of this application, an RSU may predict a movement trend, a potential conflict, or the like of a vehicle in a merging area, so as to send intent prediction information, and a vehicle or a pedestrian that receives the intent prediction information may avoid another vehicle as much as possible, to prevent a collision.

In the embodiments of this application, object intent determining may be added to a road side apparatus, so as to protect a vulnerable traffic participant (for example, a pedestrian), and further improve traffic safety. In addition, because the road side apparatus may provide intent prediction information, time for a vehicle-mounted apparatus to decide a driving behavior of a vehicle may also be shortened, thereby improving determining accuracy of autonomous driving, and finally improving driving safety.

In addition, for the foregoing two scenarios, since an RSU can obtain the fourth-type information, the RSU can also obtain the first-type information, the second-type information, and the third-type information. In this case, the RSU may further send the obtained first-type information, second-type information, and third-type information to a vehicle-mounted apparatus. For example, refer to Table 3. Table 3 shows an example of perception information sent by the RSU to the vehicle-mounted apparatus. In actual application, the perception information sent by the RSU to the vehicle-mounted apparatus may include one or more of information in Table 3. A travel intent in Table 3 is, for example, information sent by another vehicle to the RSU.

TABLE 3

| Data | Remarks |
| --- | --- |
| Moment | |
| Object type | Pedestrian/cyclist/vehicle/obstacle |
| Location (longitude and latitude) | |
| Location (elevation) | |
| Speed | |
| Moving direction angle | Clockwise angle from due north |
| Acceleration | |
| Acceleration direction | Clockwise angle from due north |
| Travel intent | Lane number of an exit target road at a crossing |

For example, the perception information includes the location (longitude and latitude), or the perception information includes the travel intent and the acceleration direction, or the perception information includes the speed, the travel direction angle, the location (altitude), and the acceleration.

Information collection may not be implemented by every object on a road. For example, some vehicle-mounted apparatuses not having a detection capability or some pedestrians cannot perform information collection, and cannot obtain a travel intent of another object on the road. However, in the embodiments of this application, a road side apparatus may comprehensively obtain intent prediction information of an object on a road. Even for objects (for example, pedestrians or some vehicle-mounted apparatuses) having neither a collection capability nor a communication capability, the road side apparatus may obtain intent prediction information of these objects by using a perception apparatus disposed on a road side, so that information obtained by the road side apparatus is comprehensive, and a driving behavior determined by the vehicle-mounted apparatuses is safer. For example, a vehicle-mounted apparatus may plan an optimal path based on the information to prevent an accident, so as to ensure safe and efficient passage through these road sections with complex road conditions.

If an RSU sends the fourth-type information to the vehicle-mounted apparatus, and a capability class of the vehicle-mounted apparatus is RV-R3, the vehicle-mounted apparatus can process the fourth-type information, and a vehicle-to-infrastructure cooperation class is RV3. Alternatively, if an RSU sends the fourth-type information to the vehicle-mounted apparatus, and a capability class of the vehicle-mounted apparatus is RV-R2, the vehicle-mounted apparatus cannot process the fourth-type information, and can process only the first-type information, the second-type information, and the third-type information, and then a vehicle-to-infrastructure cooperation class is RV2. Alternatively, if an RSU sends the fourth-type information to the vehicle-mounted apparatus, and a capability class of the vehicle-mounted apparatus is RV-R1, the vehicle-mounted apparatus cannot process the third-type information and the fourth-type information, and can process only the first-type information and the second-type information, and then a vehicle-to-infrastructure cooperation class is RV1. Alternatively, if an RSU sends the fourth-type information to the vehicle-mounted apparatus, and a capability class of the vehicle-mounted apparatus is RV-R0, the vehicle-mounted apparatus cannot process the second-type information, the third-type information, and the fourth-type information, and can process only the first-type information, and then a vehicle-to-infrastructure cooperation class is RV0.

In all of the foregoing scenarios, an example in which the RSU can obtain the fourth-type information is used. Alternatively, if an RSU can obtain only the third-type information, the RSU cannot obtain intent prediction information. In this case, the RSU may send information received from another vehicle and/or a perception apparatus to a vehicle-mounted apparatus of a vehicle that is about to enter the road section or a vehicle-mounted apparatus of a vehicle that is passing through the road section. Alternatively, if an RSU can obtain only the second-type information, the RSU cannot obtain intent prediction information and perception information. In this case, the RSU may send digital information obtained through a signal controller, a traffic control center, or the like to a vehicle-mounted apparatus of a vehicle that is about to enter the road section or a vehicle-mounted apparatus of a vehicle that is passing through the road section. Alternatively, if an RSU can obtain only the first-type information, the RSU cannot obtain intent prediction information, perception information, and digital information. In this case, the RSU may send obtained information such as a physical identifier, a sign, or a marking to a vehicle-mounted apparatus of a vehicle that is about to enter the road section or a vehicle-mounted apparatus of a vehicle that is passing through the road section. Alternatively, an RSU may further obtain the fifth-type information, that is, suggestion information. For example, a road side apparatus may analyze historical motion data of an object on the road, so as to provide different suggestion information for different objects. In this case, the RSU may further send the suggestion information to a vehicle-mounted apparatus. If the RSU needs to send a plurality of types of information to the vehicle-mounted apparatus, sending manners of the different types of information may be the same, or may be different. For example, if the RSU needs to send the first-type information, the second-type information, the third-type information, the fourth-type information, and the fifth-type information to the vehicle-mounted apparatus, sending manners of the five types of information may all be the same; or the RSU may send the first-type information, the second-type information, the third-type information, and the fourth-type information to the vehicle-mounted apparatus in a broadcast manner, and send the fifth-type information to the vehicle-mounted apparatus in a unicast manner.

In addition, for a vehicle-to-infrastructure cooperation class to reach RV3, the road side apparatus and the vehicle-mounted apparatus each need to meet a corresponding capability. For example, the capabilities that the road side apparatus and the vehicle-mounted apparatus need to meet are shown in Table 4. The capability that the road side apparatus needs to meet may include one or more of capabilities corresponding to the road side apparatus in Table 4, and the capability that the vehicle-mounted apparatus needs to meet may include one or more of capabilities corresponding to the vehicle-mounted apparatus in Table 4.

TABLE 4

| | |
|---|---|
| Capability requirements for the vehicle-mounted apparatus | 1. V2X communication capability (broadcast/multicast/unicast); 2. High-precision positioning; 3. High-precision map (lane-level); 4. Vehicle and road time synchronization; 5. Alignment of vehicle and road space coordinates; or 6. Capability of combining vehicle's own perception and road side perception to perform decision-making and planning. |
| Capability requirements for the road side apparatuses | 1. V2X communication (broadcast/multicast/unicast); 2. High-precision map; 3. High-precision positioning (where for example, a precision is that a lane can be located); 4. Vehicle and road time synchronization; 5. Alignment of vehicle and road coordinates; 6. Perception combined with intent determining that are performed by a plurality of sensors, including a capability of performing intent prediction based on historical data of an object; or 7. Information sent by the road side apparatus needs to meet a safety requirement on an automotive-grade function. |

In the embodiments of this application, a road side apparatus may provide, based on different road classes, first information used for assisted driving, autonomous driving, or the like, and a vehicle-mounted apparatus may process, based on a capability class of the vehicle-mounted apparatus, information that can be processed in the first information. In this way, a travel intent of the vehicle-mounted apparatus is determined, so that a vehicle in which the vehicle-mounted apparatus is located can avoid another vehicle or pedestrian as much as possible in a travel process, and travel safety is improved. In addition, even if the capability class of the vehicle-mounted apparatus does not match a road class of a road, the vehicle-mounted apparatus may select information that can be processed for processing, so that the vehicle-mounted apparatus does not fail to respond. In this way, intelligence of the vehicle-mounted apparatus is improved, and the vehicle-mounted apparatus can better implement a function such as autonomous driving.

The following describes, with reference to the accompanying drawings, apparatuses configured to implement the foregoing method in the embodiments of this application. Therefore, all the foregoing content may be used in subsequent embodiments, and repeated content is not described again.

Figure 9:
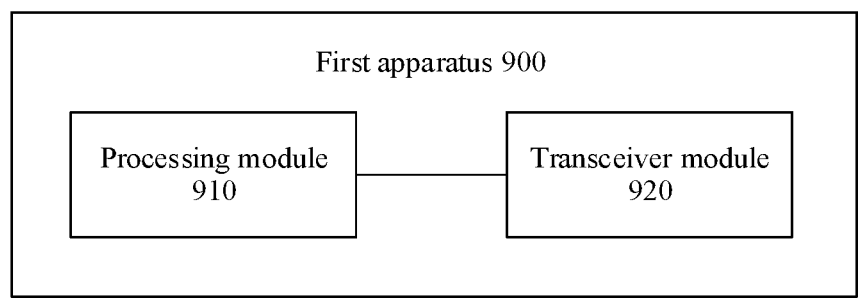
FIG. 9 is a schematic block diagram of a first type of first apparatus according to an embodiment of this application.

FIG. 9 is a schematic block diagram of a communication apparatus 900 according to an embodiment of this application. For example, the communication apparatus 900 is a first apparatus 900.

The first apparatus 900 includes a processing module 910, and optionally, may further include a transceiver module 920. Alternatively, the transceiver module 920 and the processing module 910 may be two independent apparatuses. For example, both the processing module 910 and the transceiver module 920 are carried in a first vehicle, the transceiver module 920 may be a communication unit in the first vehicle, the processing module 910 may be a processing unit in the first vehicle, and the transceiver module 920 may communicate with the processing module 910 in a wired manner or a wireless manner. For example, the first apparatus 900 may be a vehicle-mounted device, or may be a chip used in the vehicle-mounted device, or another combined device, a component, or the like that has a function of the vehicle-mounted device. When the first apparatus 900 is a vehicle-mounted device, the transceiver module 920 may be a transceiver, and may include an antenna, a radio frequency circuit, and the like, and the processing module 910 may be a processor, for example, a baseband processor. The baseband processor may include one or more central processing units (CPUs). When the first apparatus 900 is a component having a function of a terminal, the transceiver module 920 may be a radio frequency unit, and the processing module 910 may be a processor, for example, a baseband processor. When the first apparatus 900 is a chip system, the transceiver module 920 may be an input/output interface of the chip system (for example, a baseband chip), and the processing module may be a processor of the chip system, and may include one or more central processing units.

The processing module 910 may be configured to perform all operations, other than sending and receiving operations, performed by the first apparatus in the embodiment shown in FIG. 2, for example, S23 and S24, and/or configured to support another process in the technology described in this specification. The transceiver module 920 may be configured to perform all receiving and sending operations performed by the first apparatus in the embodiment shown in FIG. 2, for example, S22, and/or configured to support another process of the technology described in this specification.

In addition, the transceiver module 920 may be a functional module, and the functional module can implement both a sending operation and a receiving operation. For example, if the transceiver module 920 is a module included in the first apparatus 900, the transceiver module 920 may be configured to perform all sending operations and receiving operations performed by the first apparatus in the embodiment shown in FIG. 2. For example, when a sending operation is performed, it may be considered that the transceiver module 920 is a sending module, and when a receiving operation is performed, it may be considered that the transceiver module 920 is a receiving module. Alternatively, the transceiver module 920 may be a collective term of two functional modules, the two functional modules are a sending module and a receiving module respectively. The sending module is configured to implement a sending operation. For example, if the transceiver module 920 is a module included in the first apparatus 900, the sending module may be configured to perform all sending operations performed by the first apparatus in the embodiment shown in FIG. 2. The receiving module is configured to implement a receiving operation. For example, if the transceiver module 920 is a module included in the first apparatus 900, the receiving module may be configured to perform all receiving operations performed by the first apparatus in the embodiment shown in FIG. 2.

For example, the processing module 910 is configured to obtain first information, where the first information includes information about a road and/or information about an object on the road, and the object on the road includes a vehicle and/or a pedestrian on the road.

The processing module 910 is further configured to determine a driving behavior of the first apparatus 900 based on the first information and a capability of the first apparatus 900.

For example, the processing module 910 may obtain the first information by using the transceiver module 920. For example, the processing module 910 may obtain the first information in one or more of the following manners: The processing module 910 receives the first information from a second apparatus by using the transceiver module 920; or the processing module 910 may receive the first information from another vehicle by using the transceiver module 920; or the processing module 910 has a detection function, and the processing module 910 may send a detection signal by using the transceiver module 920, and then may obtain the first information based on a feedback signal that is corresponding to the detection signal and that is received by the transceiver module 920.

In an optional implementation, the first information includes first-type information, and the first-type information includes information about a physical identifier and/or a marking on the road.

In a possible implementation, the processing module 910 is configured to determine the driving behavior of the first apparatus 900 based on the first information and the capability of the first apparatus 900 in the following manner:
    determining the driving behavior of the first apparatus 900 based on the first-type information and the capability of the first apparatus 900.

In an optional implementation, the first information further includes second-type information, the second-type information is digital information, the digital information includes road traffic information within first duration, and the road traffic information is used to indicate any combination of one or more of the following: a traffic accident situation within the first duration, and a road construction status within the first duration, or a weather condition within the first duration.

In an optional implementation, the processing module 910 is configured to determine the driving behavior of the first apparatus 900 based on the first information and the capability of the first apparatus 900 in the following manner:
    determining the driving behavior of the first apparatus 900 based on the second-type information and the capability of the first apparatus 900.

In an optional implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

In an optional implementation, the processing module 910 is configured to determine the driving behavior of the first apparatus 900 based on the first information and the capability of the first apparatus 900 in the following manner:
    determining the driving behavior of the first apparatus 900 based on the third-type information and the capability of the first apparatus 900.

In an optional implementation, the first information further includes fourth-type information, the fourth-type information is intent prediction information, and the intent prediction information is used to indicate a driving route of the object on the road within subsequent time.

In an optional implementation, the processing module 910 is configured to determine the driving behavior of the first apparatus 900 based on the first information and the capability of the first apparatus 900 in the following manner:
    determining the driving behavior of the first apparatus 900 based on the fourth-type information and the capability of the first apparatus 900.

In an optional implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

In an optional implementation, the processing module 910 is configured to determine the driving behavior of the first apparatus 900 based on the first information and the capability of the first apparatus 900 in the following manner:
    determining the driving behavior of the first apparatus 900 based on the fifth-type information and the capability of the first apparatus 900.

It should be understood that the processing module 910 in this embodiment of this application may be implemented by a processor or a processor-related circuit component, and the transceiver module 920 may be implemented by a transceiver or a transceiver-related circuit component.

Figure 10:
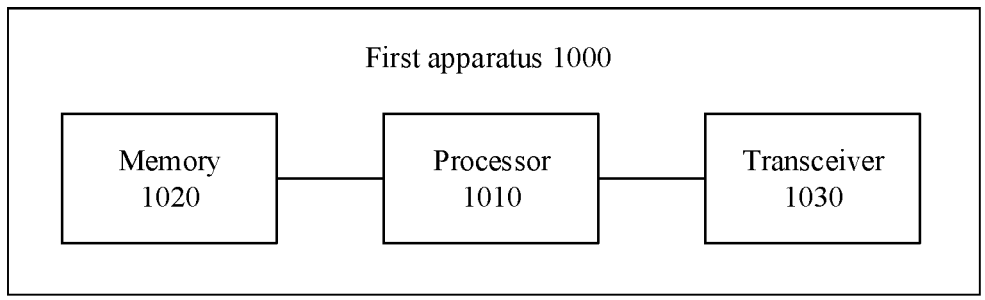
FIG. 10 is another schematic block diagram of a first type of first apparatus according to an embodiment of this application.

As shown in FIG. 10, an embodiment of this application further provides a communication apparatus 1000. For example, the communication apparatus 1000 is a first apparatus 1000. For example, the first apparatus 1000 may be a communication device, for example, a terminal device, or may be a chip system. The first apparatus 1000 includes a processor 1010 and a memory 1020, and optionally, may further include a transceiver 1030. Alternatively, the transceiver 1030 and the processor 1010 may be two independent apparatuses. For example, both the processor 1010 and the transceiver 1030 are carried in a first vehicle, the transceiver 1030 may be a communication unit in the first vehicle, the processor 1010 may be a processing unit in the first vehicle, and the transceiver 1030 may communicate with the processor 1010 in a wired manner or a wireless manner. The memory 1020 stores instructions or a program, and the processor 1010 is configured to execute the instructions or the program stored in the memory 1020. When the instructions or the program stored in the memory 1020 is executed, the processor 1010 is configured to perform an operation performed by the processing module 910 in the foregoing embodiment. If the transceiver 1030 is a functional unit included in the first apparatus 1010, the transceiver 1030 is configured to perform an operation performed by the transceiver module 920 in the foregoing embodiment.

The transceiver 1030 may be a functional unit, and the functional unit can implement both a sending operation and a receiving operation. If the transceiver 1030 is a functional unit included in the first apparatus 1000, for example, the transceiver 1030 may be configured to perform all sending operations and receiving operations performed by the first apparatus in the embodiment shown in FIG. 2. For example, when a sending operation is performed, the transceiver 1030 may be considered as a transmitter, and when a receiving operation is performed, the transceiver 1030 may be considered as a receiver. Alternatively, the transceiver 1030 may be a collective term of two functional units, and the two functional units are respectively a transmitter and a receiver. The transmitter is configured to implement a sending operation. If the transceiver 1030 is a functional unit included in the first apparatus 1000, for example, the transmitter may be configured to perform all sending operations performed by the first apparatus in the embodiment shown in FIG. 2. The receiver is configured to implement a receiving operation. If the transceiver 1030 is a functional unit included in the first apparatus 1000, for example, the receiver may be configured to perform all receiving operations performed by the first apparatus in the embodiment shown in FIG. 2.

It should be understood that the first apparatus 900 or the first apparatus 1000 according to the embodiments of this application can implement a function of the first apparatus in the embodiment shown in FIG. 2, and operations and/or functions of the modules in the second apparatus 900 or the second apparatus 1000 are respectively intended to implement corresponding procedures in the embodiment shown in FIG. 2. For brevity, details are not described herein again.

Figure 11:
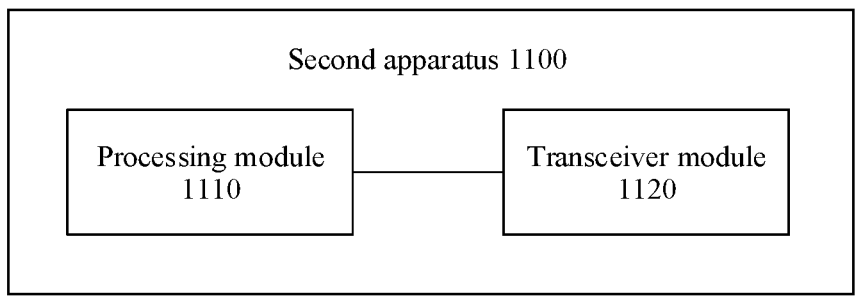
FIG. 11 is a schematic block diagram of a first type of second apparatus according to an embodiment of this application.

FIG. 11 is a schematic block diagram of a communication apparatus 1100 according to an embodiment of this application. For example, the communication apparatus 1100 is a second apparatus 1100.

The second apparatus 1100 includes a processing module 1110 and a transceiver module 1120. For example, the second apparatus 1100 may be a road side device, or may be a chip used in the road side device, or another combined device, a component, or the like that has a function of the road side device. When the second apparatus 1100 is a road side device, the transceiver module 1120 may be a transceiver, and may include an antenna, a radio frequency circuit, and the like, and the processing module 1110 may be a processor, for example, a baseband processor. The baseband processor may include one or more central processing units (CPUs). When the second apparatus 1100 is a component having a function of a terminal, the transceiver module 1120 may be a radio frequency unit, and the processing module 1110 may be a processor, for example, a baseband processor. When the second apparatus 1100 is the chip system, the transceiver module 1120 may be an input/output interface of the chip system (for example, a baseband chip), and the processing module may be a processor of the chip system, and may include one or more central processing units.

The processing module 1110 may be configured to perform all operations, other than sending and receiving operations, performed by the second apparatus in the embodiment shown in FIG. 2, for example, S21, and/or configured to support another process in the technology described in this specification. The transceiver module 1120 may be configured to perform all receiving and sending operations performed by the second apparatus in the embodiment shown in FIG. 2, for example, S22, and/or configured to support another process of the technology described in this specification.

In addition, the transceiver module 1120 may be a functional module. The functional module can implement both a sending operation and a receiving operation. For example, the transceiver module 1120 may be configured to perform all sending operations and receiving operations performed by the second apparatus in the embodiment shown in FIG. 2. For example, when a sending operation is performed, it may be considered that the transceiver module 1120 is a sending module, and when a receiving operation is performed, it may be considered that the transceiver module 1120 is a receiving module. Alternatively, the transceiver module 1120 may be a collective term of two functional modules. The two functional modules are a sending module and a receiving module. The sending module is configured to implement a sending operation. For example, the sending module may be configured to perform all sending operations performed by the second apparatus in the embodiment shown in FIG. 2. The receiving module is configured to implement a receiving operation. For example, the receiving module may be configured to perform all receiving operations performed by the second apparatus in the embodiment shown in FIG. 2.

For example, the processing module 1110 is configured to obtain first information, where the first information includes information about a road and/or information about an object on the road, and the object on the road includes a vehicle and/or a pedestrian on the road.

The transceiver module 1120 is configured to send the first information, where the first information is used by a first apparatus to determine a driving behavior of the first apparatus.

In an optional implementation, the processing module 1110 is configured to obtain the first information in any combination of one or more of the following manners:
  obtaining the first information by using a perception apparatus disposed on a road side;
  obtaining the first information by using a cloud server; or
  receiving the first information from the at least one vehicle on the road by using the transceiver module 1120.

In an optional implementation, the first information includes second-type information, the second-type information is digital information, the digital information includes traffic information and/or meteorological information within first duration, the traffic information is used to indicate a traffic accident situation and/or a road construction status within the first duration, and the meteorological information is used to indicate a weather condition within the first duration.

In an optional implementation, the first information further includes third-type information, the third-type information is perception information, and the perception information includes real-time status information of the road that is obtained in a perception manner, and/or includes real-time information that is obtained in the perception manner and that is about the vehicle and/or the pedestrian on the road.

In an optional implementation, the first information further includes fourth-type information, the fourth-type information is intent prediction information, and the intent prediction information is used to indicate a driving route of the object on the road within subsequent time.

In an optional implementation, the first information further includes fifth-type information, the fifth-type information is suggestion information, and the suggestion information is used to indicate any combination of one or more of the following: a driving route planned for the first vehicle, driving time planned for the first vehicle, or a speed planned for the first vehicle.

It should be understood that the processing module 1110 in this embodiment of this application may be implemented by a processor or a processor-related circuit component, and the transceiver module 1120 may be implemented by a transceiver or a transceiver-related circuit component.

Figure 12:
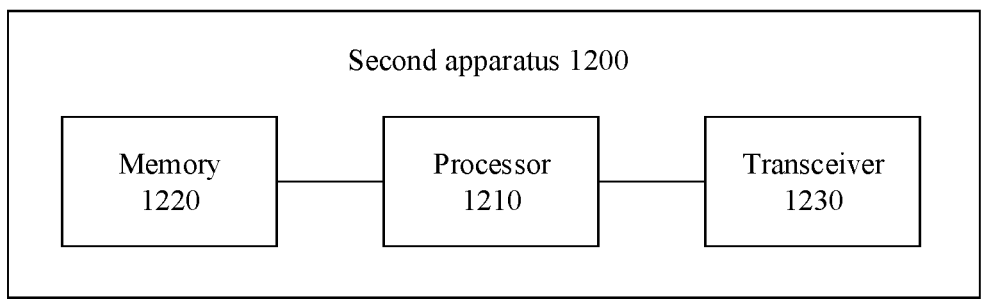
FIG. 12 is another schematic block diagram of a first type of second apparatus according to an embodiment of this application.

As shown in FIG. 12, an embodiment of this application further provides a communication apparatus 1200. For example, the communication apparatus 1200 is a second apparatus 1200. For example, the second apparatus 1200 may be a communication device, for example, a road side device, or may be a chip system. The second apparatus 1200 includes a processor 1210, a memory 1220, and a transceiver 1230. The memory 1220 stores instructions or a program, and the processor 1210 is configured to execute the instructions or the program stored in the memory 1220. When the instructions or the program stored in the memory 1220 is executed, the processor 1210 is configured to perform an operation performed by the processing module 1110 in the foregoing embodiment, and the transceiver 1230 is configured to perform an operation performed by the transceiver module 1120 in the foregoing embodiment.

The transceiver 1230 may be a functional unit, and the functional unit can implement both a sending operation and a receiving operation. For example, the transceiver 1230 may be configured to perform all sending operations and receiving operations performed by the second apparatus in the embodiment shown in FIG. 2. For example, when a sending operation is performed, the transceiver 1230 may be considered as a transmitter, and when a receiving operation is performed, the transceiver 1230 may be considered as a receiver. Alternatively, the transceiver 1230 may be a collective term of two functional units, and the two functional units are respectively a transmitter and a receiver. The transmitter is configured to implement a sending operation. For example, the transmitter may be configured to perform all sending operations performed by the second apparatus in the embodiment shown in FIG. 2. The receiver is configured to implement a receiving operation. For example, the receiver may be configured to perform all receiving operations performed by the second apparatus in the embodiment shown in FIG. 2.

It should be understood that the second apparatus 1100 or the second apparatus 1200 according to the embodiments of this application can implement a function of the second apparatus in the embodiment shown in FIG. 2, and operations and/or functions of the modules in the second apparatus 1100 or the second apparatus 1200 are respectively intended to implement corresponding procedures in the embodiment shown in FIG. 2. For brevity, details are not described herein again.

An embodiment of this application further provides a communication apparatus. The communication apparatus may be a vehicle-mounted apparatus, a road side apparatus, or a circuit. The communication apparatus may be configured to perform an action performed by the first apparatus or the second apparatus in the method embodiment shown in FIG. 2.

Figure 13:
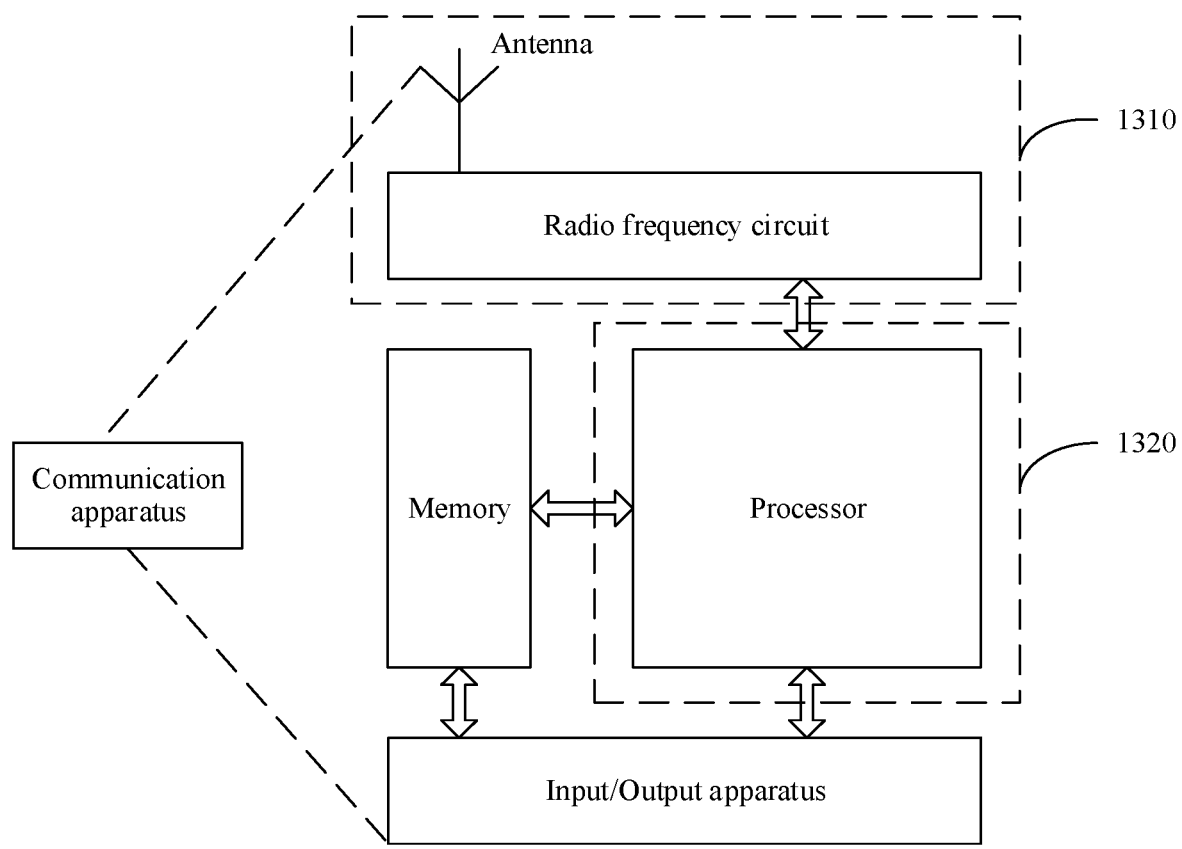
FIG. 13 is a schematic block diagram of a communication apparatus according to an embodiment of this application.

When the communication apparatus is the first apparatus or the second apparatus, FIG. 13 is a schematic diagram of a structure of the simplified communication apparatus. As shown in FIG. 13, the communication apparatus includes a processor, a memory, a radio frequency circuit, an antenna, and an input/output apparatus. The processor is mainly configured to: process a communication protocol and communication data, and control the communication apparatus to execute a software program, process data of the software program, and the like. The memory is mainly configured to store the software program and the data. A radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to receive data entered by a user and output data to the user. It should be noted that some communication apparatuses may not have the input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the communication apparatus, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 13. In an actual communication apparatus product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna having receiving and sending functions and the radio frequency circuit may be considered as a transceiver unit of the communication apparatus, and the processor having a processing function may be considered as a processing unit of the communication apparatus. As shown in FIG. 13, the communication apparatus includes a transceiver unit 1310 and a processing unit 1320. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1310 and configured to implement the receiving function may be considered as a receiving unit, and a component that is in the transceiver unit 1310 and configured to implement the sending function may be considered as a sending unit. In other words, the transceiver unit 1310 includes a receiving unit and a sending unit. The transceiver unit may also be sometimes referred to as a transceiver, a transceiver machine, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1310 is configured to perform sending and receiving operations of the first apparatus in the method embodiment shown in FIG. 2, and the processing unit 1320 is configured to perform another operation on a side of the first apparatus in the method embodiment shown in FIG. 2 other than the sending and receiving operations.

For example, in an implementation, the transceiver unit 1310 is configured to perform sending and receiving steps of the first apparatus in the embodiment shown in FIG. 2, for example, S22, and/or support another process of the technology described in this specification. The processing unit 1320 is configured to perform operations, other than the sending and receiving operations, performed by the first apparatus in the embodiment shown in FIG. 2, for example, S23 and S24 in the embodiment shown in FIG. 2, and/or support another process of the technology described in this specification.

Alternatively, the transceiver unit 1310 is configured to perform sending and receiving operations of the second apparatus in the method embodiment shown in FIG. 2, and the processing unit 1320 is configured to perform another operation performed by the second apparatus in the method embodiment shown in FIG. 2 other than the sending and receiving operations.

For example, in an implementation, the transceiver unit 1310 is configured to perform sending and receiving steps of the second apparatus in the embodiment shown in FIG. 2, for example, S22, and/or support another process of the technology described in this specification. The processing unit 1320 is configured to perform another operation, other than the sending and receiving operations, performed by the second apparatus in the embodiment shown in FIG. 2, for example, S21, and/or support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 14:
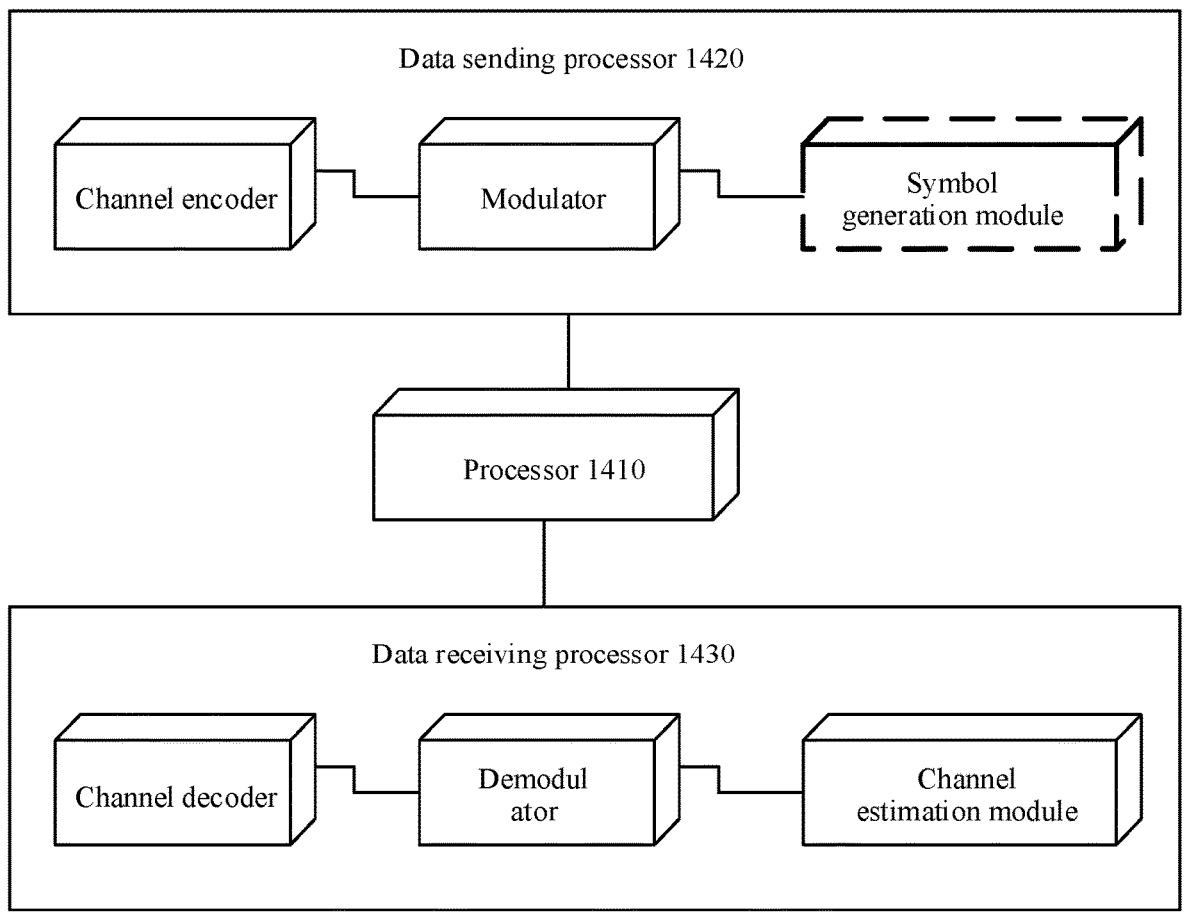
FIG. 14 is another schematic block diagram of a communication apparatus according to an embodiment of this application.

For the communication apparatus in this embodiment of this application, further refer to the device shown in FIG. 14. In an example, the device may implement a function similar to that of the processor 1410 in FIG. 14. In FIG. 14, the device includes a processor 1410, a data sending processor 1420, and a data receiving processor 1430. The processing module 910 in the foregoing embodiment may be the processor 1410 in FIG. 14, and implements a corresponding function, and the transceiver module 920 in the foregoing embodiment may be the data sending processor 1420 and/or the data receiving processor 1430 in FIG. 14. Alternatively, the processing module 1110 in the foregoing embodiment may be the processor 1410 in FIG. 14, and implements a corresponding function, and the transceiver module 1120 in the foregoing embodiment may be the data sending processor 1420 and/or the data receiving processor 1430 in FIG. 14.

Although FIG. 14 shows a channel encoder and a channel decoder, it may be understood that the modules are merely examples, and do not constitute a limitation on this embodiment.

Figure 15:
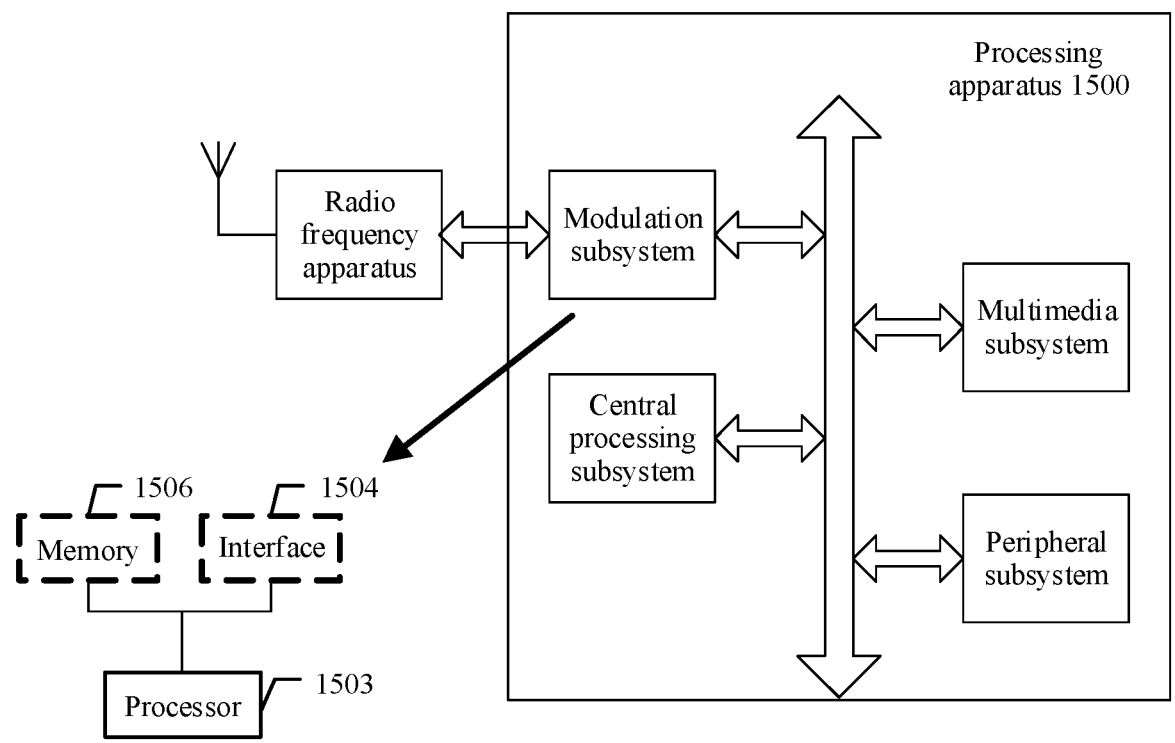
FIG. 15 is still another schematic block diagram of a communication apparatus according to an embodiment of this application.

FIG. 15 shows another form of this embodiment. A processing apparatus 1500 includes modules such as a modulation subsystem, a central processing subsystem, and a peripheral subsystem. The communication apparatus in this embodiment may be used as the modulation subsystem in the processing apparatus 1500. Specifically, the modulation subsystem may include a processor 1503 and an interface 1504. The processor 1503 implements a function of the processing module 910, and the interface 1504 implements a function of the transceiver module 920. Alternatively, the processor 1503 implements a function of the processing module 1110, and the interface 1504 implements a function of the transceiver module 1120. In another variation, the modulation subsystem includes a memory 1506, the processor 1503, and a program that is stored in the memory 1506 and that can be run on the processor. When executing the program, the processor 1503 implements a method of a side of the first apparatus or the second apparatus in the foregoing method embodiment shown FIG. 2. It should be noted that the memory 1506 may be non-volatile or volatile. The memory 1506 may be located in the modulation subsystem, or may be located in the processing apparatus 1500, provided that the memory 1506 can be connected to the processor 1503.

An embodiment of this application further provides a first communication system. The communication system may include at least one first apparatus in the embodiment shown in FIG. 2, and include at least one second apparatus in the embodiment shown in FIG. 2. The first apparatus is, for example, the first apparatus 900 in FIG. 9 or the first apparatus 1000 in FIG. 10. The second apparatus is, for example, the second apparatus 1100 in FIG. 11 or the second apparatus 1200 in FIG. 12. For example, the first apparatus may be configured to perform all operations performed by the first apparatus in the embodiment shown in FIG. 2, for example, S22 to S24 in the embodiment shown in FIG. 2, and/or configured to support another process of the technology described in this specification. The second apparatus may be configured to perform all operations performed by the second apparatus in the embodiment shown in FIG. 2, for example, S21 and S22 in the embodiment shown in FIG. 2, and/or configured to support another process of the technology described in this specification.

An embodiment of this application further provides a computer-readable storage medium. The computer-readable storage medium stores a computer program. When the program is executed by a processor, a procedure related to the first apparatus in the embodiment shown in FIG. 2 provided in the foregoing method embodiments may be implemented.

An embodiment of this application further provides a computer-readable storage medium. The computer-readable storage medium stores a computer program. When the program is executed by a processor, a procedure related to the second apparatus in the embodiment shown in FIG. 2 provided in the foregoing method embodiments may be implemented.

An embodiment of this application further provides a computer program product including instructions. When the instructions are executed, the method on a side of the first apparatus in the method embodiment shown in FIG. 2 is performed.

An embodiment of this application further provides a computer program product including instructions. When the instructions are executed, the method on a side of the second apparatus in the method embodiment shown in FIG. 2 is performed.

It should be understood that, the processor in the embodiments of this application may be a central processing unit (CPU), or may be another general purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

It should be further understood that the memory in the embodiments of this application may be a volatile memory, or a non-volatile memory, or may include both a volatile memory and a non-volatile memory. The non-volatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM and is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that, in the embodiments of this application, sequence numbers of the foregoing processes do not mean execution sequences. The execution sequences of the processes should be determined based on functions and internal logic of the processes, and should not constitute any limitation on implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions in the embodiments of this application.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to an existing technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A vehicle-to-infrastructure cooperation method, comprising:
    obtaining, by a first apparatus, first information, wherein the first information comprises information about at least one of a road and information about an object on the road, the object on the road comprises at least one of a vehicle and a pedestrian on the road, and the first information indicates at least one type of information among multiple types of information and the first information further comprises second-type information, wherein the second-type information is digital information, and the digital information comprises road traffic information within a first duration and the road traffic information indicates a road construction status within the first duration; and
    determining, by the first apparatus, a driving behavior of the first apparatus based on the first information, including the second-type information and a capability of the first apparatus, wherein the capability of the first apparatus comprises a capability class of the first apparatus, and wherein the first information further comprises information about a sign for the capability class of the vehicle.

2. The method according to claim 1, wherein the multiple types of information comprises at least one of the following:
    first-type information comprising information about at least one of a physical identifier and a marking on the road;
    third-type information, wherein the third-type information is perception information, and the perception information comprises at least one of real-time status information of the road that is obtained in a perception manner, and comprises real-time information that is obtained in the perception manner and that is about the vehicle and/or the pedestrian on the road;
    fourth-type information, wherein the fourth-type information is intent prediction information, and the intent prediction information is used to indicate a driving route of the object on the road within subsequent time; or
    fifth-type information, wherein the fifth-type information is suggestion information, and the suggestion information is used to indicate any combination of one or more of the following: a driving route planned for the first vehicle, driving time planned for the first vehicle, or a speed planned for the first vehicle.

3. The method according to claim 1, wherein the multiple types of information comprises:
    third-type information, wherein the third-type information is perception information, and the perception information comprises at least one of real-time status information of the road that is obtained in a perception manner, and real-time information that is obtained in the perception manner and that is about at least one of the vehicle and the pedestrian on the road;

fourth-type information, wherein the fourth-type information is intent prediction information, and the intent prediction information is used to indicate a driving route of the object on the road within subsequent time; and fifth-type information, wherein the fifth-type information is suggestion information, and the suggestion information is used to indicate any combination of one or more of the following: a driving route planned for the first vehicle, driving time planned for the first vehicle, or a speed planned for the first vehicle.

4. A communication apparatus, comprising:

a non-transitory memory configured to store instructions; and a processor coupled to the memory, wherein the instructions cause the processor to be configured to:

obtain first information, wherein the first information comprises information about at least one of a road and information about an object on the road, the object on the road comprises at least one of a vehicle and a pedestrian on the road, and the first information indicates at least one type of information among multiple types of information and the first information further comprises second-type information, wherein the second-type information is digital information, and the digital information comprises road traffic information within first duration and the road traffic information indicates a road construction status within the first duration; and determine a driving behavior of a first apparatus based on the first information, including the second-type information and a capability of the first apparatus, wherein the capability of the first apparatus comprises a capability class of the first apparatus, and wherein the first information further comprises information about a sign for the capability class of the vehicle.

5. The apparatus of claim 4, wherein the multiple types of information comprises at least one of the following:

first-type information comprising information about at least one of a physical identifier and a marking on the road;

third-type information, wherein the third-type information is perception information, and the perception information comprises at least one of real-time status information of the road that is obtained in a perception manner, and real-time information that is obtained in the perception manner and that is about the vehicle and/or the pedestrian on the road;

fourth-type information, wherein the fourth-type information is intent prediction information, and the intent prediction information is used to indicate a driving route of the object on the road within subsequent time; or fifth-type information, wherein the fifth-type information is suggestion information, and the suggestion information is used to indicate any combination of one or more of the following: a driving route planned for the first vehicle, driving time planned for the first vehicle, or a speed planned for the first vehicle.

6. The apparatus of claim 4, wherein the multiple types of information comprises:

third-type information, wherein the third-type information is perception information, and the perception information comprises at least one of real-time status information of the road that is obtained in a perception manner, and real-time information that is obtained in the perception manner and that is about at least one of the vehicle and the pedestrian on the road;

fourth-type information, wherein the fourth-type information is intent prediction information, and the intent prediction information is used to indicate a driving route of the object on the road within subsequent time; and fifth-type information, wherein the fifth-type information is suggestion information, and the suggestion information is used to indicate any combination of one or more of the following: a driving route planned for the first vehicle, driving time planned for the first vehicle, or a speed planned for the first vehicle.

7. A communication apparatus, comprising:

a non-transitory memory configured to store instructions; and a processor coupled to the memory, wherein the instructions cause the processor to be configured to:

obtain first information, wherein the first information comprises at least one of information about a road and information about an object on the road, the object on the road comprises at least one of a vehicle and a pedestrian on the road, and the first information indicates at least one type of information among multiple types of information and the first information further comprises second-type information, wherein the second-type information is digital information, and the digital information comprises road traffic information within first duration and the road traffic information indicates a road construction status within the first duration; and send the first information, wherein the first information, including the second-type information is used by a first apparatus to determine a driving behavior of the first apparatus, wherein the first apparatus further uses a capability class of the first apparatus, and wherein the first information further comprises information about a sign for the capability class of the first apparatus.

8. The apparatus of claim 7, wherein the instructions further cause the processor to be configured to execute at least one of the following:

obtaining the first information by using a perception apparatus disposed on a road side;

obtaining the first information by using a cloud server; or receiving the first information from at least one vehicle on the road.

9. The apparatus of claim 7, wherein the multiple types of information comprises at least one of the following:

first-type information comprising information about at least one of a physical identifier and a marking on the road;

third-type information, wherein the third-type information is perception information, and the perception information comprises at least one of real-time status information of the road that is obtained in a perception manner, and real-time information that is obtained in the perception manner and that is about at least one of the vehicle and the pedestrian on the road;

fourth-type information, wherein the fourth-type information is intent prediction information, and the intent prediction information is used to indicate a driving route of the object on the road within subsequent time; or fifth-type information, wherein the fifth-type information is suggestion information, and the suggestion information is used to indicate any combination of one or more of the following: a driving route planned for the first vehicle, driving time planned for the first vehicle, or a speed planned for the first vehicle.

10. The apparatus of claim 7, wherein the multiple types of information comprises:
- third-type information, wherein the third-type information is perception information, and the perception information comprises at least one of real-time status information of the road that is obtained in a perception manner, and real-time information that is obtained in the perception manner and that is about at least one of the vehicle and the pedestrian on the road;
- fourth-type information, wherein the fourth-type information is intent prediction information, and the intent prediction information is used to indicate a driving route of the object on the road within subsequent time; and
- fifth-type information, wherein the fifth-type information is suggestion information, and the suggestion information is used to indicate any combination of one or more of the following: a driving route planned for the first vehicle, driving time planned for the first vehicle, or a speed planned for the first vehicle.

* * * * *